United States Patent
Lee et al.

(10) Patent No.: US 10,500,545 B2
(45) Date of Patent: Dec. 10, 2019

(54) SIPHON-TYPE AIR DIFFUSION DEVICE, MEMBRANE BIOREACTOR, AND WATER TREATMENT METHOD

(71) Applicant: Mitsubishi Chemical Corporation, Chiyoda-ku (JP)

(72) Inventors: Yunje Lee, Tokyo (JP); Makoto Ideguchi, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/254,036

(22) Filed: Jan. 22, 2019

(65) Prior Publication Data

US 2019/0151804 A1 May 23, 2019

Related U.S. Application Data

(63) Continuation of application No. PCT/JP2018/004826, filed on Feb. 13, 2018.

(30) Foreign Application Priority Data

Feb. 22, 2017 (JP) ................. 2017-030915
Jun. 15, 2017 (JP) ................. 2017-118024

(51) Int. Cl.
*B01D 65/02* (2006.01)
*C02F 3/12* (2006.01)
(Continued)

(52) U.S. Cl.
CPC .......... *B01D 65/02* (2013.01); *B01F 3/04248* (2013.01); *C02F 3/1273* (2013.01);
(Continued)

(58) Field of Classification Search
CPC .......... B01D 2313/26; B01D 2321/185; B01D 65/02; B01F 3/04241; B01F 3/04113; B01F 3/04255; C02F 3/1273
(Continued)

(56) References Cited

U.S. PATENT DOCUMENTS

2007/0166171 A1 7/2007 Kondo
2009/0194477 A1 8/2009 Hashimoto
(Continued)

FOREIGN PATENT DOCUMENTS

JP 2003-340250 12/2003
JP 2004-322100 11/2004
(Continued)

OTHER PUBLICATIONS

International Search Report and Written Opinion of the International Searching Authority issued in Application No. PCT/JP2018/004826, dated Mar. 13, 2018, with English translation.
(Continued)

*Primary Examiner* — Claire A Norris
(74) *Attorney, Agent, or Firm* — Oblon, McClelland, Maier & Neustadt, L.L.P.

(57) ABSTRACT

A siphon-type air diffusion device for intermittently performing aeration, comprising: at least two siphon-type air diffusion pipes; and an air supply member that supplies air to the siphon-type air diffusion pipes, wherein the siphon-type air diffusion pipe includes a siphon chamber which includes a first siphon chamber and a second siphon chamber on the downstream side of the first siphon chamber, a communication portion which communicates the first siphon chamber and the second siphon chamber with each other, an air diffusion hole which is provided on the downstream side of the siphon chamber, a path which extends from the siphon chamber to the air diffusion hole, and a treatment water inlet
(Continued)

which is provided on the upstream side of the siphon chamber, wherein the air supply member includes a distribution pipe which extends in an arrangement direction of the siphon-type air diffusion pipe, and an introduction portion which is branched from the distribution pipe and includes at least one air supply port supplying air to the siphon-type air diffusion pipe, wherein the distribution pipe is provided above the air supply port, and wherein in the air supply port of the introduction portion, the air supply port located at the uppermost position in the vertical direction is provided below a lower end of a partition wall dividing the siphon chamber and the path.

12 Claims, 19 Drawing Sheets

(51) Int. Cl.
  *C02F 3/20* (2006.01)
  *B01F 3/04* (2006.01)
  *B01F 15/02* (2006.01)
(52) U.S. Cl.
  CPC .............. *C02F 3/20* (2013.01); *C02F 3/208* (2013.01); *B01D 2315/06* (2013.01); *B01D 2321/185* (2013.01); *B01F 3/04241* (2013.01); *B01F 15/024* (2013.01); *B01F 2003/04319* (2013.01); *B01F 2003/04872* (2013.01); *B01F 2215/0052* (2013.01); *C02F 2303/20* (2013.01); *C02F 2303/22* (2013.01); *Y02W 10/15* (2015.05)
(58) Field of Classification Search
  USPC ............................................ 210/321.69, 636
  See application file for complete search history.

(56) References Cited

U.S. PATENT DOCUMENTS

| | | | |
|---|---|---|---|
| 2011/0049047 A1 | 3/2011 | Cumin et al. | |
| 2012/0091602 A1 | 4/2012 | Cumin et al. | |
| 2014/0076806 A1* | 3/2014 | Min ..................... | B01F 15/024 210/636 |
| 2016/0114292 A1 | 4/2016 | Colby et al. | |
| 2017/0120197 A1 | 5/2017 | Tanaka et al. | |

FOREIGN PATENT DOCUMENTS

| | | |
|---|---|---|
| JP | 2009-183939 | 8/2009 |
| JP | 2013-503738 | 2/2013 |
| JP | 2016-047532 | 4/2016 |
| WO | WO 2015/146686 A1 | 10/2015 |

OTHER PUBLICATIONS

Search Report dated Jul. 24, 2019 issued in corresponding European patent application No. 18758189.7 (citing document AA).

* cited by examiner

SIPHON-TYPE AIR DIFFUSION DEVICE, MEMBRANE BIOREACTOR, AND WATER TREATMENT METHOD

The present application is a continuation application of International Application No. PCT/JP2018/04826, filed on Feb. 13, 2018, which claims priority of Japanese Patent Application No. 2017-030915 filed on Feb. 22, 2017 and Japanese Patent Application No. 2017-118024 filed on Jun. 15, 2017 and the contents are incorporated herein.

TECHNICAL FIELD

The present invention relates to a siphon-type air diffusion device, a membrane bioreactor, and a water treatment method.

BACKGROUND ART

Industrial wastewater and domestic wastewater are reused as industrial water after these wastewater are subjected to a treatment for removing organic matter and the like contained therein or are discharged to rivers and the like. As a treatment method of industrial wastewater or the like, for example, an activated sludge method can be exemplified. The activated sludge method is a method of decomposing organic matter and the like into aerobic microorganisms by aeration.

In recent years, a treatment according to a membrane separation activated sludge (MBR) method in which a treatment according to an activated sludge method and a membrane filtration using a separation membrane module are combined has been carried out. In the treatment according to the MBR method, since organic matter or the like accumulates on the surface of the separation membrane as the membrane filtration is continued, a decrease in filtration flow rate and an increase in transmembrane pressure difference occur.

With regard to such a problem, in the treatment according to the MBR method, the accumulation of organic matter on the membrane surface is prevented by an air diffusion pipe disposed below the membrane module. Specifically, the accumulation of organic matter on the membrane surface is prevented by the impact generated when the bubbles generated from the air diffusion pipe contact the membrane surface or the vibration of the membrane itself due to a water flow in accordance with the generation of bubbles.

From the viewpoint of the washability for the membrane surface, it is preferable to increase the size of the bubble. Patent Literatures 1 and 2 disclose a siphon-type air diffusion pipe which efficiently discharges large bubbles. Further, Patent Literature 3 discloses a method of supplying a gas from a plurality of gas outlets of a distribution pipe disposed above or below a plurality of discharge guide pipes (corresponding to siphon-type air diffusion pipes) and intermittently discharging bubbles from a plurality of discharge guide pipes.

Further, Patent Literature 4 discloses a membrane separation unit capable of performing an intermittent aeration operation with a simple configuration without requiring a particular control system and increasing an electric cost as compared with a continuous aeration operation.

When the siphon-type air diffusion pipe is used to wash the membrane module, the siphon-type air diffusion pipes are arranged in use in response to the size and the number of the membrane modules. In order to supply air to each siphon-type air diffusion pipe, a method of directly connecting a plurality of introduction pipes branched from a distribution pipe to an air supply port of an upper portion of each siphon-type air diffusion pipe or disposing a single pipe with a hole directly below each siphon-type air diffusion pipe to send air into each siphon chamber is used.

CITATION LIST

Patent Literature

Patent Literature 1: JP 2003-340250 A
Patent Literature 2: JP 2004-322100 A
Patent Literature 3: JP 2013-503738 W
Patent Literature 4: JP 2009-183939 A

SUMMARY OF THE INVENTION

Problem to be Solved by the Invention

However, in the conventional siphon-type air diffusion pipe, the washability for the membrane surface is not sufficient.

Further, in the embodiment in which air is supplied from the single pipe disposed at a lower position to the siphon-type air diffusion pipe, the single pipe is easily clogged and target treatment water does not easily flow into the siphon chamber due to the interference of the single pipe so that the diffused bubbles become unexpectedly small.

Further, when air is supplied from the air supply port formed at the upper portion of the siphon-type air diffusion pipe, the air supply port is exposed from the target treatment water in a case in which the air is supplied into the air diffusion pipe. When sludge is scattered and attached to the air supply port in this state, the sludge is dried and solidified so that the air supply port is easily blocked by the sludge.

Moreover, as a result of an examination, the inventors have found that air is not uniformly diffused from the siphon-type air diffusion pipes particularly when a flow rate of air is small if a plurality of siphon-type air diffusion pipes are arranged and a plurality of introduction pipes branched from a distribution pipe are directly connected to an air supply port formed at an upper portion of each siphon-type air diffusion pipe. That is, it has found that the bubbles discharged from any one of the siphon-type air diffusion pipes become unexpectedly small or no bubble is diffused whenever air is diffused from each siphon-type air diffusion pipe.

The invention has been made in view of such circumstances and an object of the invention is to provide a siphon-type air diffusion device and a membrane bioreactor having excellent washability for a membrane surface along with a water treatment method.

Further, an object of the invention is to provide a siphon-type air diffusion device and a membrane bioreactor capable of preventing an air supply port from being clogged by sludge and performing an air diffusion from at least a plurality of siphon-type air diffusion pipes at a uniform air flow rate along with a water treatment method.

Means for Solving Problem

The invention has the following configuration.
[1] A siphon-type air diffusion device for intermittently performing aeration, comprising:
  at least two siphon-type air diffusion pipes; and
  an air supply member that supplies air to the siphon-type air diffusion pipes, in which the siphon-type air diffusion pipe includes
a siphon chamber which includes a first siphon chamber and a second siphon chamber on the downstream side of the first siphon chamber,
a communication portion which communicates the first siphon chamber and the second siphon chamber with each other,
an air diffusion hole which is provided on the downstream side of the siphon chamber,
a path which extends from the siphon chamber to the air diffusion hole, and
a treatment water inlet which is provided on the upstream side of the siphon chamber,
in which the air supply member includes
a distribution pipe which extends in an arrangement direction of the siphon-type air diffusion pipe, and
an introduction portion which is branched from the distribution pipe and includes at least one air supply port supplying air to the siphon-type air diffusion pipe,
in which the distribution pipe is provided above the air supply port, and
in which in the air supply port of the introduction portion, the air supply port located at the uppermost position in the vertical direction is provided below a lower end of a partition wall dividing the siphon chamber and the path.
[2] The siphon-type air diffusion device according to [1],
in which the air supply port located at the uppermost position in the vertical direction is provided above a lower end of the path.
[3] The siphon-type air diffusion device according to [1] or [2],
in which the introduction portion is provided so as to be located between the adjacent siphon-type air diffusion pipes, and
in which the air supply port includes a notch portion formed at a portion facing the treatment water inlet of an end portion opposite to the distribution pipe in the introduction portion.
[4] The siphon-type air diffusion device according to any one of [1] to [3],
in which air is supplied from the introduction portion to each of the siphon chambers of at least two siphon-type air diffusion pipes adjacent to the introduction portion.
[5] The siphon-type air diffusion device according to any one of [1] to [4],
in which the introduction portion is a guide pipe and the air supply port is provided at a lower end of the guide pipe.
[6] The siphon-type air diffusion device according to any one of [1] to [5],
in which a minimum cross-sectional area of a passage of the introduction portion is 20 to 350 mm$^2$.
[7] The siphon-type air diffusion device according to any one of [1] to [6],
in which a plan view shape of the air diffusion hole is an elongated shape extending in the arrangement direction of the siphon-type air diffusion pipe, and
in which an area of a plan view shape of the air diffusion hole is 25 cm$^2$ or less and a length of the plan view shape in the longitudinal direction is 25 cm or less.
[8] The siphon-type air diffusion device according to any one of [1] to [7],
in which a ratio R (unit: m) calculated based on the following equation using the area of the plan view shape of the air diffusion hole satisfies a condition of 0.6 or more.

$$R = \text{(Volume (unit: m}^3\text{) of siphon chamber)/(Area (unit: m}^2\text{) of plan view shape of air diffusion hole)}$$

[9] The siphon-type air diffusion device according to any one of [1] to [8],
in which the introduction portion and the siphon-type air diffusion pipe are integrated with each other.
[10] The siphon-type air diffusion device according to any one of [1] to [9],
in which the distribution pipe and the siphon-type air diffusion pipe are integrated with each other.
[11] A membrane bioreactor including:
the siphon-type air diffusion device according to any one of [1] to [10]; and
a membrane module which performs a membrane separation treatment on sludge-containing treatment water containing activated sludge.
[12] A water treatment method including:
performing an activated sludge treatment on raw water using activated sludge; and
performing a membrane separation treatment on sludge-containing treatment water obtained by the activated sludge treatment,
in which the membrane bioreactor according to [11] is used in the membrane separation.

Effect of the Invention

According to the invention, a siphon-type air diffusion device and a membrane bioreactor having excellent washability for a membrane surface are provided along with a water treatment method.

Further, a siphon-type air diffusion device and a membrane bioreactor capable of preventing an air supply port from being clogged by sludge and performing an air diffusion from at least a plurality of siphon-type air diffusion pipes at a uniform air flow rate are provided along with a water treatment method.

MODE(S) FOR CARRYING OUT THE INVENTION

Hereinafter, an example of an embodiment of the invention will be described with reference to the drawings. Furthermore, the dimensions and the like illustrated in the following description are merely examples and the invention is not necessarily limited thereto. The dimensions and the like can be appropriately modified without departing from the gist thereof.

<First Embodiment of Invention>
[Water Treatment Device]

Hereinafter, an example of a water treatment device which is used in a water treatment method of a first embodiment of the invention will be described with reference to FIG. 1.

Figure 1:
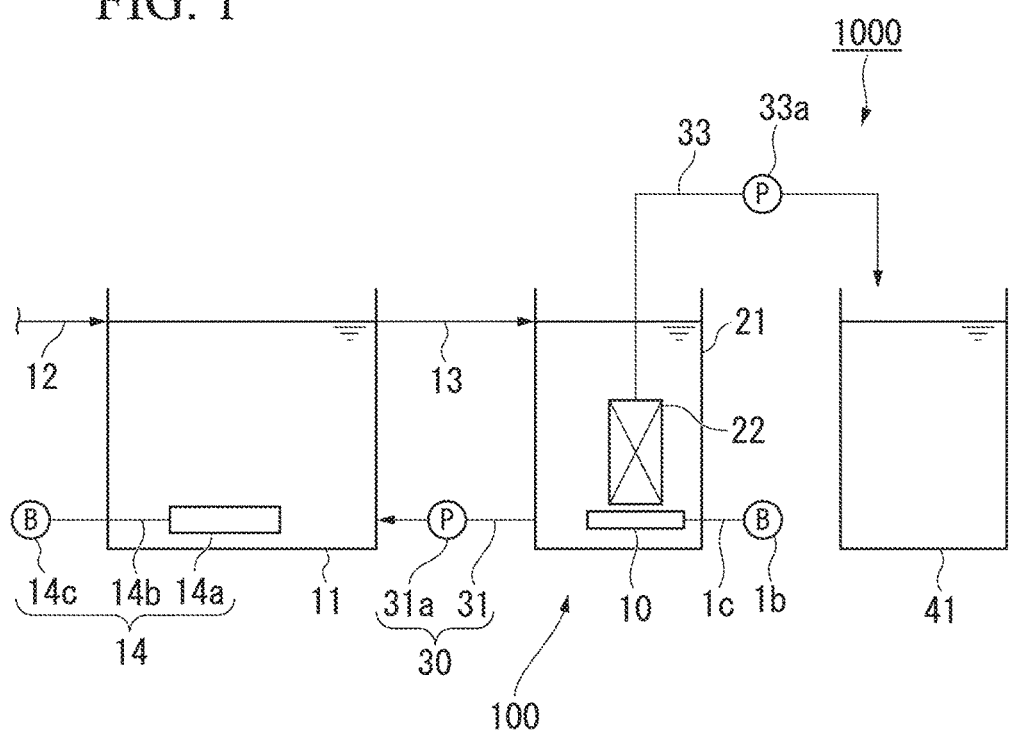
FIG. 1 is a schematic diagram illustrating an example of a water treatment device which is used in a water treatment method of a first embodiment of the invention.

FIG. 1 is a schematic diagram illustrating a configuration of a water treatment device according to the water treatment method of the first embodiment of the invention. As illustrated in FIG. 1, a water treatment device 1000 of the first embodiment of the invention includes an activated sludge treatment tank 11, a membrane separation tank 21, and a treatment water tank 41.

Further, although not illustrated in the drawings, the water treatment device 1000 includes a flow rate adjustment tank which adjusts a flow rate of raw water flowing into the activated sludge treatment tank 11, a pump which draws excess sludge from the membrane separation tank 21, a feeding unit which feeds chemical liquid and dilution water to the membrane separation tank 21, and a discharging unit which discharges treatment water from the treatment water tank 41 to factories or rivers.

In a water treatment method using the water treatment device, first, wastewater (raw water) such as industrial wastewater or domestic wastewater is subjected to an activated sludge treatment in the activated sludge treatment tank 11 so as to become biological treatment water (an activated sludge treatment step). Next, sludge-containing treatment water containing the activated sludge and the biological treatment water is subjected to a membrane separation treatment by the membrane separation tank 21 provided at the downstream side of the activated sludge treatment tank 11 (a membrane separation step). A part of the sludge-containing treatment water is carried from the membrane separation tank 21 to the activated sludge treatment tank 11 by a sludge carrying unit 30. The treatment water obtained by performing the membrane separation treatment on the sludge-containing treatment water is stored in the treatment water tank 41.

The activated sludge treatment tank 11 is filled with activated sludge for the activated sludge treatment.

A first passage 12 and a second passage 13 are connected to the activated sludge treatment tank 11. The first passage 12 is a passage through which raw water discharged from factories or households is caused to flow into the activated sludge treatment tank 11. Meanwhile, the second passage 13 is a passage through which the sludge-containing treatment water discharged from the activated sludge treatment tank 11 flows into the membrane separation tank 21.

Further, an air diffusion device 14 is provided inside the activated sludge treatment tank 11 to maintain an aerobic condition inside the tank.

The air diffusion device 14 includes an air diffusion pipe 14a which diffuses air inside the activated sludge treatment tank 11, an introduction pipe 14b which supplies air into the air diffusion pipe 14a, and a blower 14c which blows air.

The air diffusion pipe 14a is not particularly limited as long as air supplied from the blower 14c can be discharged upward, but for example, a single pipe with a hole or a membrane type pipe can be exemplified.

The membrane separation tank 21 is used to collect the sludge-containing treatment water which is sent from the activated sludge treatment tank 11 and contains the activated sludge and the biological treatment water.

The membrane separation tank 21 includes a membrane bioreactor 100 according to an embodiment of the invention. The membrane bioreactor 100 will be described later.

The sludge carrying unit 30 is used to carry a part of the sludge-containing treatment water from the membrane separation tank 21 to the activated sludge treatment tank 11.

The sludge carrying unit 30 includes a fourth passage 31. The fourth passage 31 is a passage through which a part of the sludge-containing treatment water is discharged from the membrane separation tank 21 and is caused to flow into the activated sludge treatment tank 11.

The fourth passage 31 is provided with a pump 31a. Accordingly, a part of the sludge-containing treatment water inside the membrane separation tank 21 can be carried from the membrane separation tank 21 to the activated sludge treatment tank 11.

The treatment water tank 41 is used to store the treatment water obtained by performing a membrane separation treatment on the sludge-containing treatment water.

(Membrane Bioreactor)

As illustrated in FIG. 1, the membrane bioreactor 100 (hereinafter, referred to as the "MBR device 100") includes a membrane module 22 and a siphon-type air diffusion device 10 provided below the membrane module 22.

The membrane module 22 is used to perform a membrane separation treatment on the sludge-containing treatment water containing the activated sludge. The membrane module 22 includes a separation membrane and separates the sludge-containing treatment water into the biological treatment water and the activated sludge by a solid-liquid separation (membrane separation) treatment of the separation membrane.

The separation membrane is not particularly limited as long as a separation function is provided and, for example, a hollow fiber membrane, a flat membrane, a cylindrical membrane, a monolithic membrane, and the like can be exemplified. Among these, the hollow fiber membrane is desirable due to its high volume filling ratio.

When the hollow fiber membrane is used as the separation membrane, examples of the material thereof include cellulose, polyolefin, polysulfone, polyvinylidene fluoride (PVDF), polytetrafluoroethylene (PTFE), and the like. Among these, PVDF and PTFE are preferable as a material of the hollow fiber membrane from the viewpoint of the strongness to chemical resistance and pH change.

When the monolithic membrane is used as the separation membrane, it is preferable to use a ceramic membrane.

As the average hole diameter of fine holes formed in the separation membrane, the average hole diameter is about 0.001 µm to 0.1 µm in a membrane generally called an ultrafiltration membrane and is about 0.1 µm to 1 µm in a membrane generally called a precision separation membrane. In the embodiment, it is preferable to use the separation membrane of which the average hole diameter is within the above-described range.

The third passage 33 is connected to the membrane module 22. The third passage 33 is a passage through which the treatment water passing through the separation membrane is discharged from the membrane separation tank 21 and is caused to flow into the treatment water tank 41.

The third passage 33 is provided with a pump 33a. Accordingly, the treatment water passing through the separation membrane of the membrane module 22 can be discharged from the membrane separation tank 21.

The siphon-type air diffusion device 10 is an air diffusion device which intermittently performs aeration by using a siphon action. The siphon-type air diffusion device 10 includes at least two siphon-type air diffusion pipes and at least two introduction pipes.

Figure 2:
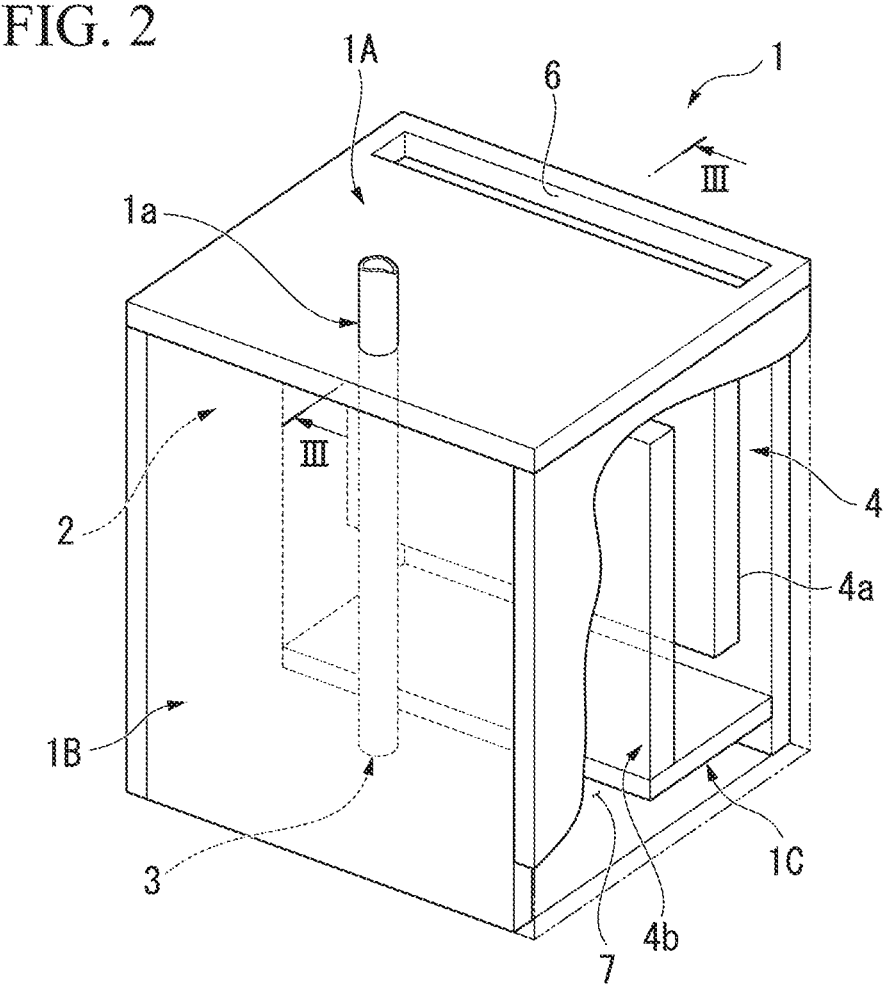
FIG. 2 is a schematic perspective view of a siphon-type air diffusion pipe 1 of the first embodiment of the invention.
Figure 3:
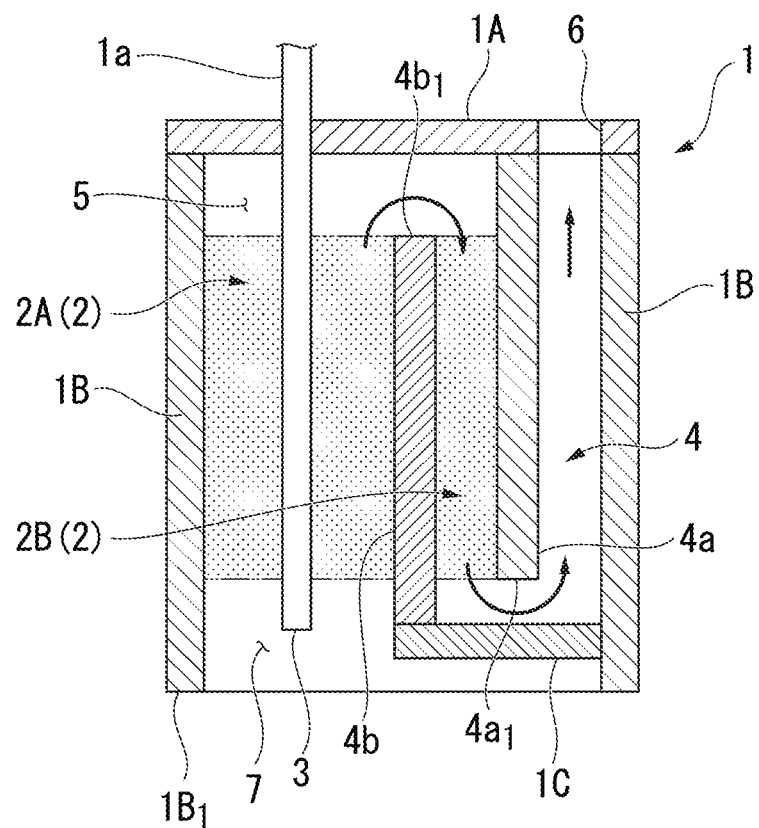
FIG. 3 is a cross-sectional view taken along a line of FIG. 2.

FIG. 2 is a schematic perspective view of the siphon-type air diffusion pipe 1 of the embodiment. FIG. 3 is a cross-sectional view taken along a line of FIG. 2. Further, an arrow illustrated in FIG. 3 indicates a flow of the sludge-containing treatment water inside the siphon-type air diffusion pipe 1. As illustrated in FIGS. 2 and 3, the siphon-type air diffusion pipe 1 includes a siphon chamber 2, a path 4, a communication portion 5, an air diffusion hole 6, and a treatment water inlet 7. In the specification, when it is assumed that there is a flow of wastewater from the treatment water inlet 7 toward the air diffusion hole 6, a position on the side of the treatment water inlet 7 will be referred to as an "upstream" and a position on the side of the air diffusion hole 6 will be referred to as a "downstream".

The siphon-type air diffusion pipe 1 is a box-shaped casing which is formed by a combination of a plurality of plate-shaped members and includes an upper plate 1A, four side plates 1B, a bottom plate 1C, a first partition wall 4a, and a second partition wall 4b. The side plate 1B and the first partition wall 4a extend downward from the upper plate 1A to the upper plate 1A.

The second partition wall 4b extends upward from the bottom plate 1C to the bottom plate 1C and is located on the side of the side plate 1B of the first partition wall 4a. The first partition wall 4a and the second partition wall 4b face each other.

The siphon chamber 2 is used to store air. The siphon chamber 2 indicates a space having a height from an upper end $4b_1$ of the second partition wall 4b to a lower end $4a_1$ of the first partition wall 4a. The siphon chamber 2 is divided into a first siphon chamber 2A and a second siphon chamber 2B by the second partition wall 4b. The upper portion of the first siphon chamber 2A and the upper portion of the second siphon chamber 2B communicate with each other by the communication portion 5. A part of the first partition wall 4a faces the siphon chamber 2 and the path 4. In other words, a part of the first partition wall 4a divides the siphon chamber 2 and the path 4. Further, a part of the second partition wall 4b faces the siphon chamber 2. The upper end $4b_1$ of the second partition wall 4b is located above at least the lower end $4a_1$ of the first partition wall 4a.

Furthermore, in the present specification, the first partition wall 4a corresponds to the partition wall of claims.

The length of the bottom plate 1C is shorter than that of the upper plate 1A. The treatment water inlet 7 indicates a gap which is formed by the side plate 1B and the bottom plate 1C. The treatment water inlet 7 is located below (at the upstream of) the siphon chamber 2. The treatment water inlet 7 causes the outside of the siphon-type air diffusion pipe 1 to communicate with the siphon chamber 2. Further, the treatment water inlet 7 is located below the lower end $4a_1$ of the first partition wall 4a.

The upper plate 1A is provided with the air diffusion hole 6 and the air diffusion hole 6 is provided at the downstream of the siphon chamber 2. Further, an introduction pipe 1a penetrates in the thickness direction of the upper plate 1A.

The plan view shape of the air diffusion hole 6 is an elongated rectangular shape extending in the arrangement direction of the siphon-type air diffusion pipe 1. The area of the plan view shape of the air diffusion hole 6 is preferably 25 cm² or less and more preferably 20 cm² or less. Further, the length of the plan view shape of the air diffusion hole 6 in the longitudinal direction is preferably 25 cm or less and more preferably 20 cm or less.

Further, in the embodiment, a ratio R (unit: m) calculated based on the following equation using the area of the plan view shape of the air diffusion hole 6 satisfies a condition of 0.6 or more. Further, the ratio R is preferably 0.61 or more and more preferably larger than 0.67.

$R$=(Volume (unit: m³) of siphon chamber)/(Area (unit: m²) of plan view shape of air diffusion hole)

Further, since a decrease in cost is realized by increasing the area of the air diffusion hole 6 and decreasing the number of the siphon-type air diffusion pipes 1, the ratio R is preferably 0.8 or less and more preferably 0.75 or less. The upper and lower limit values of the ratio R can be arbitrarily combined.

In the above equation, the volume of the siphon chamber 2 can be obtained from values obtained by measuring the depth, the width, and the height of the siphon chamber 2.

The path 4 indicates a path extending from the siphon chamber 2 to the air diffusion hole 6. The remaining portion of the second partition wall 4b and the first partition wall 4a face the path 4.

The siphon-type air diffusion pipe 1 is provided at a position in which a gap between the separation membranes of the membrane module 22 overlaps the air diffusion hole 6 when the membrane separation tank 21 is viewed from above.

Furthermore, an opening portion may be provided at a position not facing the siphon chamber 2 and the communication portion 5 in the path 4. In other words, an opening portion may be provided at a position other than the first partition wall 4a. Further, an adjustment mechanism capable of adjusting an opening amount of the opening portion may be provided. Since the siphon-type air diffusion pipe 1 includes such an adjustment mechanism, it is possible to adjust the size and the intermittent time of bubbles.

Figure 4:
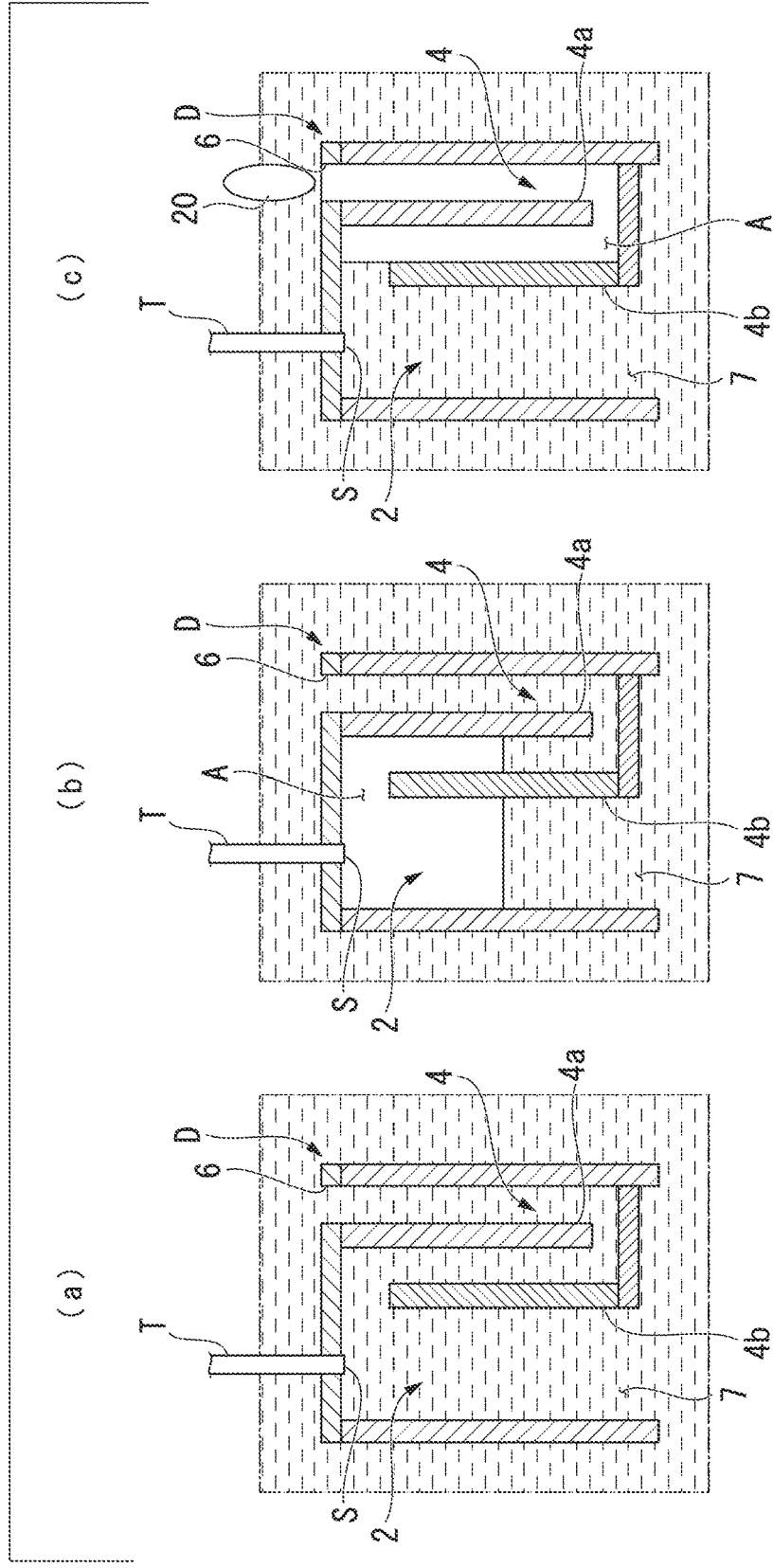
FIG. 4 is a schematic cross-sectional view describing an operation mechanism of a conventional siphon-type air diffusion pipe.

Here, an operation mechanism of a conventional siphon-type air diffusion pipe will be described. FIG. 4 is a schematic cross-sectional view describing an operation mechanism of a conventional siphon-type air diffusion pipe. As illustrated in FIG. 4, in a conventional siphon-type air diffusion pipe D, a gas supply port S is provided inside the siphon chamber 2. As illustrated in FIG. 4(a), the siphon chamber 2, the communication portion 5 (see FIG. 3), and the path 4 are filled with the sludge-containing treatment water in a state before an operation starts. Here, air is continuously supplied from a gas supply port S of an introduction pipe T.

When air is continuously supplied from the gas supply port S, the sludge-containing treatment water inside the siphon chamber 2 is pushed out from the air diffusion hole 6 or the treatment water inlet 7 so that a liquid level L of the siphon chamber 2 gradually falls as illustrated in FIG. 4(b).

When air is further supplied from the gas supply port S so that the height of the liquid level L becomes lower than the lower end $4a_1$ of the first partition wall 4a, air A stored in the siphon chamber 2 and the communication portion 5 is discharged from the air diffusion hole 6 at once through the path 4 to form bubbles 20 as illustrated in FIG. 4(c). Further, the sludge-containing treatment water flows from the treatment water inlet 7 into the siphon chamber 2 simultaneously with the formation of the bubbles 20 so as to enter the state illustrated in FIG. 4(a) again. In this way, in the siphon-type air diffusion pipe 1, the states of FIGS. 4(a) to 4(c) are repeated.

Figure 5:
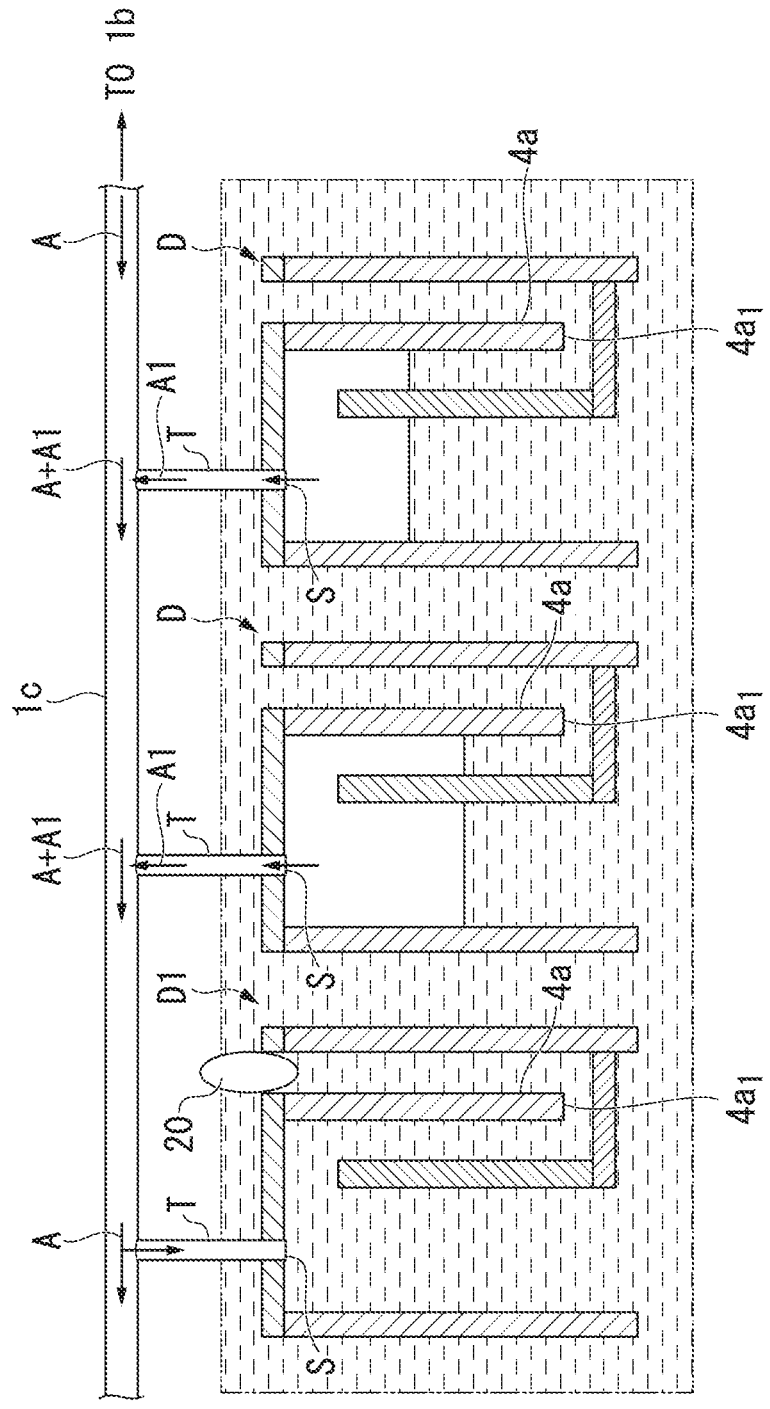
FIG. 5 is a schematic cross-sectional view illustrating a flow of air at the time of generating bubbles from a plurality of siphon-type air diffusion pipes D.

A case of generating bubbles from the plurality of siphon-type air diffusion pipes D by connecting the plurality of conventional siphon-type air diffusion pipes D is assumed. FIG. 5 is a schematic cross-sectional view illustrating a flow of air at the time of generating bubbles from the plurality of siphon-type air diffusion pipes D. Furthermore, in FIG. 5, the arrangement directions of the plurality of siphon-type air diffusion pipes D are set to be different for convenience of description. Further, FIG. 5 illustrates a case in which three siphon-type air diffusion pipes D are used.

When considering a case of generating bubbles from the plurality of siphon-type air diffusion pipes D using such a siphon-type air diffusion device, the following phenomenon occurs.

In general, the height of the liquid level L of the siphon chamber 2 normally changes due to the bubbles generated from the siphon-type air diffusion pipe 1. When the height of the liquid level L of the siphon chamber 2 is different in the plurality of siphon-type air diffusion pipes D, a time at which the height of the liquid level L reaches the lower end $4a_1$ of the first partition wall 4a is different. For example, in the siphon-type air diffusion pipe D1, when the height of the liquid level L first reaches the lower end $4a_1$ of the first partition wall 4a, the bubbles 20 are generated. Meanwhile, in the remaining siphon-type air diffusion pipes D, only a small amount of bubbles may be generated or bubbles may not be generated at all.

Regarding such a phenomenon, the inventors speculated as follows. First, a negative pressure is formed inside the siphon-type air diffusion pipe D1 when the siphon-type air diffusion pipe D1 generates bubbles. Here, the siphon chamber of the siphon-type air diffusion pipe D1 communicates with the siphon chambers of the remaining siphon-type air diffusion pipes D through the introduction pipe T. For that reason, air A1 stored in the remaining siphon-type air diffusion pipes D flows reversely in the introduction pipe T and flows to the siphon-type air diffusion pipe D1. Thus, it was speculated that only a small amount of bubbles may be generated or bubbles may not be generated at all in the remaining siphon-type air diffusion pipes D.

Regarding such problems, as a result of intensive investigation by the inventors, a siphon-type air diffusion device capable of uniformly generating bubbles from a plurality of siphon-type air diffusion pipes by controlling a flow of air was found by focusing on the height of the gas supply port of the introduction pipe and hence the invention was completed.

Figure 6:
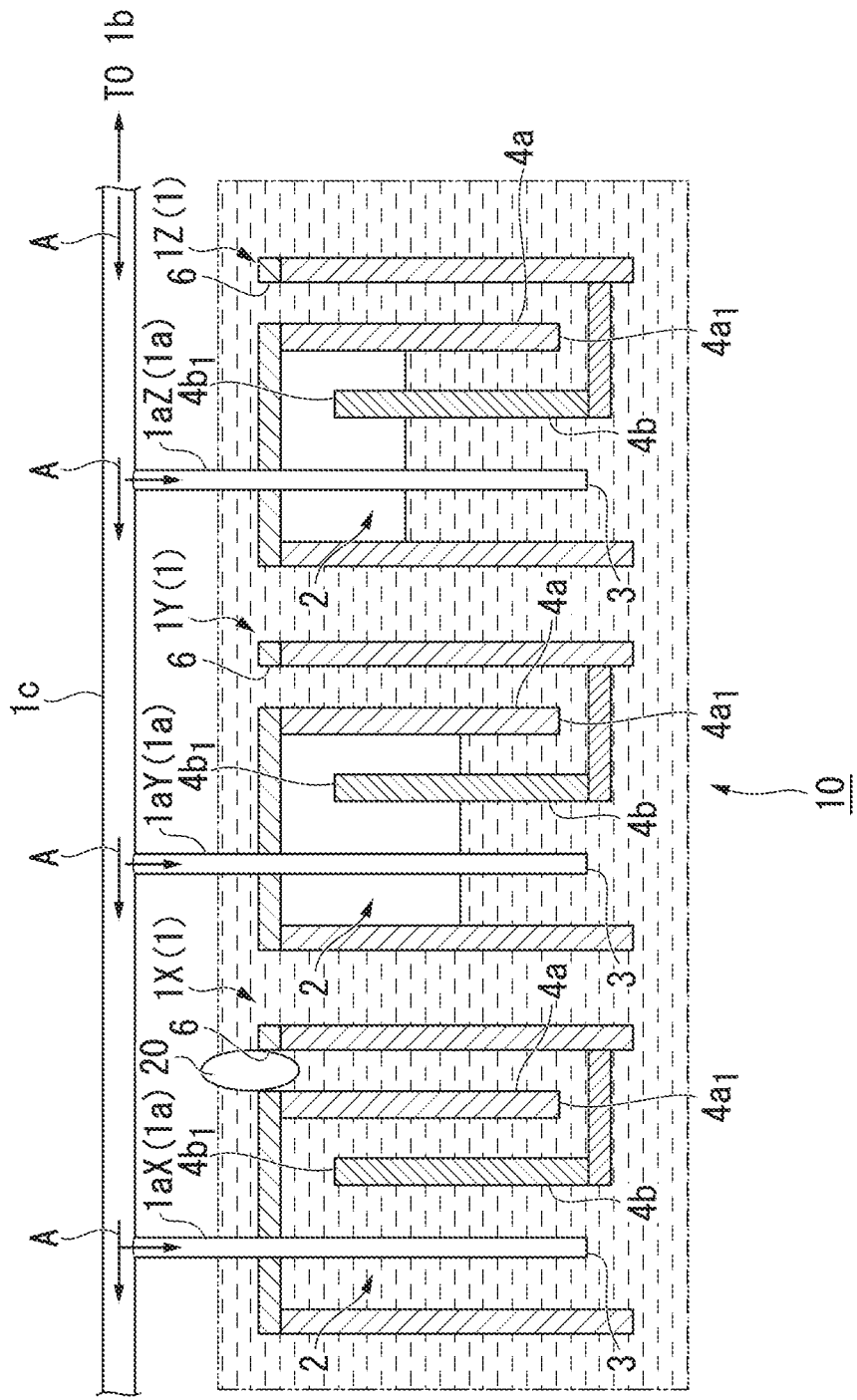
FIG. 6 is a schematic cross-sectional view illustrating a flow of air at the time of generating of bubbles from a siphon-type air diffusion device 10 of the first embodiment of the invention.

FIG. 6 is a schematic cross-sectional view illustrating a flow of air at the time of generating bubbles from the siphon-type air diffusion device 10 of the embodiment. Furthermore, in FIG. 6, the arrangement directions of the plurality of siphon-type air diffusion pipes 1 are set to be different for convenience of description. Further, FIG. 6 illustrates three siphon-type air diffusion pipes 1 and three introduction pipes 1a.

Three siphon-type air diffusion pipes 1 are arranged in series. Three siphon-type air diffusion pipes 1 include a siphon-type air diffusion pipe 1X, a siphon-type air diffusion pipe 1Y, and a siphon-type air diffusion pipe 1Z.

Three introduction pipes 1a are used to supply air to three siphon-type air diffusion pipes 1. Three introduction pipes 1a include an introduction pipe 1aX, an introduction pipe 1aY, and an introduction pipe 1aZ. The introduction pipe 1aX corresponds to the siphon-type air diffusion pipe 1X, the introduction pipe 1aY corresponds to the siphon-type air diffusion pipe 1Y, and the introduction pipe 1aZ corresponds to the siphon-type air diffusion pipe 1Z.

Three introduction pipes 1a are connected by a distribution pipe 1c. Three introduction pipes 1a extend straightly downward in the vertical direction from the distribution pipe 1c. Further, the distribution pipe 1c is connected to a blower 1b which blows air to the distribution pipe 1c. The air A blown by the blower 1b passes through the distribution pipe 1c and is distributed to each of three introduction pipes 1a connected to the distribution pipe 1c.

In at least one siphon-type air diffusion pipe 1, the gas supply port 3 of the introduction pipe 1a is provided below the lower end $4a_1$ of the first partition wall 4a. Further, the distribution pipe 1c which connects the plurality of introduction pipes 1a is connected to the upper portion of the gas supply port 3. In the siphon-type air diffusion pipe 1, that is, the gas supply port 3 is disposed outside the siphon chamber 2 capable of storing the air A. For that reason, the following things are assumed when the siphon-type air diffusion device 10 of the embodiment is assumed.

First, the siphon-type air diffusion pipe 1X generates bubbles so that a negative pressure is formed inside the siphon-type air diffusion pipe 1X. Here, the siphon chamber of the siphon-type air diffusion pipe 1X is independent from the siphon chamber of the remaining siphon-type air diffusion pipes 1. For that reason, it is assumed that the air A1 which is stored in the siphon chambers of the remaining siphon-type air diffusion pipes 1 does not flow reversely in the introduction pipe T and does not flow to the siphon-type air diffusion pipe 1X. Thus, it is thought that bubbles can be generated also in the remaining siphon-type air diffusion pipes 1.

The cross-sectional shape of the introduction pipe 1a is not particularly limited. For example, when the cross-sectional shape of the introduction pipe 1a is circular, the inner diameter of the introduction pipe 1a is preferably 4 mm or more and 25 mm or less, more preferably 4.5 mm or more and 15 mm or less, further preferably 5 mm or more and 10 mm or less, and particularly preferably 5.5 mm or more and 8.5 mm or less. It is preferable that the inner diameter of the introduction pipe 1a is 4 mm or more in that sludge hardly clogs. In the embodiment, the inner diameter of the introduction pipe 1a is set to be uniform.

Further, when the inner diameter of the introduction pipe 1a is larger than 25 mm, air is likely to be preferentially distributed to the introduction pipe 1a close to the blower 1b or the introduction pipe 1a in which a water pressure is relatively low due to the gradient of the installation surface of the siphon-type air diffusion pipe 1 in the plurality of introduction pipes 1a. Thus, when the inner diameter of the introduction pipe 1a is 25 mm or less, air can be efficiently distributed from the distribution pipe 1c to the plurality of introduction pipes 1a.

In the embodiment, the cross-sectional area of the distribution pipe 1c is formed to be larger than that of the introduction pipe 1a. The cross-sectional shape of the distribution pipe 1c is not particularly limited. For example, when the cross-sectional shape of the distribution pipe 1c is circular, the inner diameter of the distribution pipe 1c is preferably 20 mm or more and 60 mm or less.

It is preferable that the gas supply port 3 be provided above a lower end $1B_1$ of the side plate 1B.

Since the gas supply port 3 is provided above the lower end $1B_1$ of the side plate 1B, it is possible to realize a decrease in cost by preventing the introduction pipe 1a from becoming unnecessarily long.

In the siphon-type air diffusion device 10, it is preferable that the gas supply ports 3 of all introduction pipes 1a constituting the siphon-type air diffusion device 10 be provided below the lower end $4a_1$ of the first partition wall 4a.

Since the gas supply port 3 can be easily formed in the introduction pipe 1a, the gas supply port 3 is provided at a lower end $1a_1$ of the introduction pipe 1a.

Furthermore, the gas supply port provided in the introduction pipe may be provided at a plurality of positions. Here, when the introduction pipe is provided with a plurality of gas supply ports, the air supply port is provided so that the air supply port located at the uppermost position in the vertical direction among the plurality of gas supply ports is lower than the lower end of the partition wall dividing the siphon chamber and the path. Further, it is preferable that at least one of the plurality of gas supply ports be provided at the lower end of the introduction pipe.

According to the siphon-type air diffusion device 10 with the above-described configuration, the following effect can be obtained.

The siphon chambers of the plurality of siphon-type air diffusion pipes 1 are independent from one another. For that reason, it is speculated that the air A1 stored in the siphon chambers of the remaining siphon-type air diffusion pipes 1 does not flow outward through the introduction pipe T even when bubbles are generated in any one of the plurality of siphon-type air diffusion pipes 1. Thus, it is thought that bubbles can be generated also in the remaining siphon-type air diffusion pipes 1.

Further, the area of the plan view shape of the air diffusion hole 6 is large as compared with the conventional siphon-type air diffusion device. For that reason, the siphon-type air diffusion device 10 can generate bubbles larger than those of the conventional siphon-type air diffusion device and hence can widen the washable range.

When the ratio R calculated based on the above equation using the area of the plan view shape of the air diffusion hole 6 is 0.6 or more, it is possible to uniformly generate bubbles from the plurality of siphon-type air diffusion pipes 1 even when the height of the liquid level inside the siphon-type air diffusion pipe 1 changes. Further, it is particularly effective to provide the siphon-type air diffusion device 10 in an inclined surface in that an influence on the siphon action is large.

Since the air diffusion hole 6 having such a dimension is provided, it is possible to uniformly generate bubbles from the plurality of siphon-type air diffusion pipes 1 while maintaining high washability even when the height of the liquid level inside the siphon-type air diffusion pipe 1 changes. Further, it is particularly effective to provide the siphon-type air diffusion device 10 in an inclined surface in that an influence on the siphon action is large.

Further, in the siphon-type air diffusion device 10, the distribution pipe 1c is not provided below the plurality of siphon-type air diffusion pipes 1. For that reason, the siphon-type air diffusion device 10 can be used also in a place in which a liquid level is low.

Further, in the embodiment, since there is no need to provide many siphon-type air diffusion pipes or a separate bubble diffusion structure in order to improve washability, the device itself can be simplified.

Thus, the siphon-type air diffusion device 10 of the embodiment has excellent washability for the membrane surface.

Further, according to the MBR device including such a siphon-type air diffusion device 10, it is possible to effectively prevent deposition of organic matter on the membrane surface even when the height of the liquid level inside the siphon-type air diffusion pipe 1 changes.

Further, according to the water treatment method using the MBR device 100, it is possible to stably perform a water treatment by effectively preventing deposition of organic matter on the membrane surface even when the height of the liquid level inside the siphon-type air diffusion pipe 1 changes.

Furthermore, the siphon-type air diffusion pipe, the membrane bioreactor, and the water treatment method according to an embodiment of the invention are not limited to the above-described embodiment.

For example, in the above-described embodiment, it has mentioned that the plurality of introduction pipes 1a penetrate in the thickness direction of the upper plate 1A, but the invention is not limited thereto. For example, at least one introduction pipe 1a of the plurality of introduction pipes 1a may penetrate in the thickness direction of the side plate 1B facing the siphon chamber 2.

Further, it has mentioned that the plurality of introduction pipes 1a extend straightly downward from the distribution pipe 1c, but the invention is not limited thereto. At least one introduction pipe 1a of the plurality of introduction pipes 1a may be inclined so that an inclination angle from the horizontal direction becomes 45° or more. When the inclination angle of the introduction pipe 1a is 45° or more, sludge flowing into the introduction pipe 1a can be caused to easily flow outward and the clogging of sludge inside the introduction pipe 1a can be prevented. Since the plurality of introduction pipes 1a are inclined, it is possible to reduce a space above the siphon-type air diffusion pipe 1. Accordingly, it is possible to improve the washability for the membrane surface by decreasing a distance from the membrane surface.

Further, it has mentioned that the inner diameters of the plurality of introduction pipes 1a are uniform, but the inner diameters may decrease in a direction moving away from the upper plate 1A. In that case, since sludge is difficult to flow into the introduction pipe 1a, it is possible to prevent the clogging of the sludge inside the introduction pipe 1a.

Further, in the above-described embodiment, a case in which the activated sludge treatment tank 11 and the membrane separation tank 21 are provided separately from each other has been described, but the membrane separation tank 21 may be provided inside the activated sludge treatment tank 11.

<Second Embodiment of Invention>

[Water Treatment Device]

Hereinafter, an example of a water treatment device used in a water treatment method of a second embodiment of the invention will be described with reference to FIG. 8.

Figure 8:
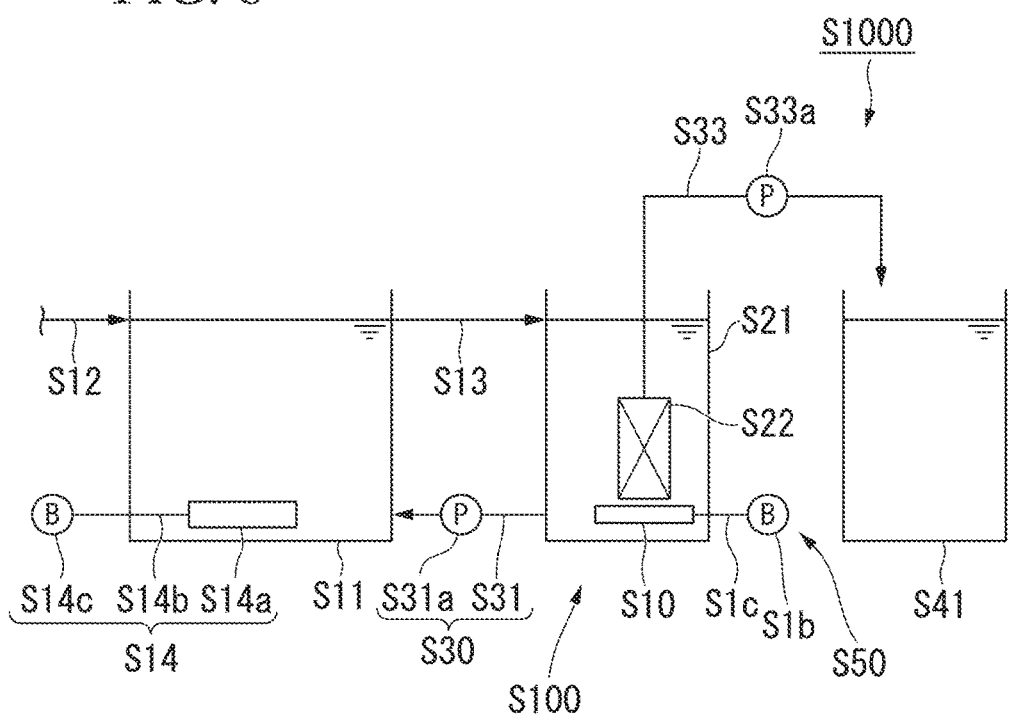
FIG. 8 is a schematic diagram illustrating an example of a water treatment device which is used in a water treatment method of a second embodiment of the invention.
Figure 9:
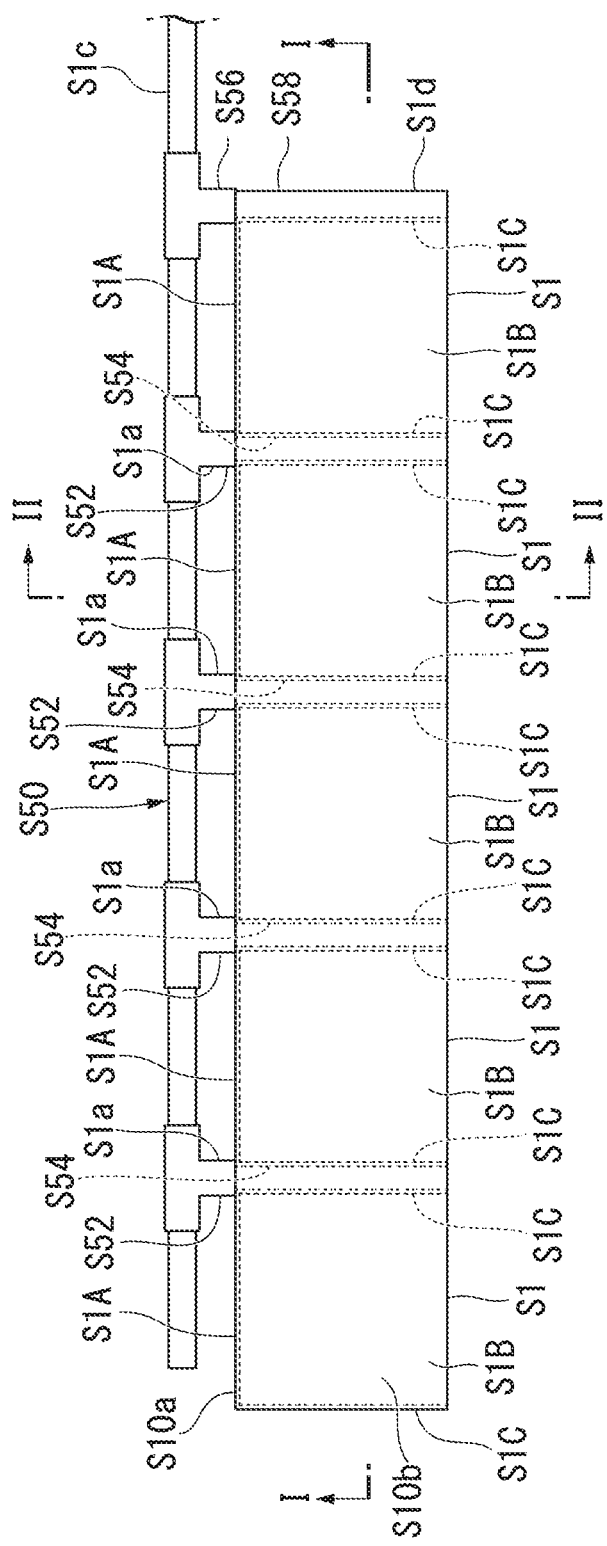
FIG. 9 is a schematic front view illustrating an example of a siphon-type air diffusion device of the second embodiment of the invention.

As illustrated in FIG. 8, a water treatment device S1000 of the embodiment includes an activated sludge treatment tank S11, a membrane separation tank S21 which is provided at a subsequent stage of the activated sludge treatment tank S11, and a treatment water tank S41 which is provided at a subsequent stage of the membrane separation tank S21. Further, although not illustrated in the drawings, the water treatment device S1000 includes a flow rate adjustment tank which adjusts a flow rate of raw water flowing into the activated sludge treatment tank S11, a pump which draws excess sludge from the membrane separation tank S21, a feeding unit which feeds chemical liquid and dilution water to the membrane separation tank S21, and a discharging unit which discharges the treatment water from the treatment water tank S41 to factories or rivers.

The activated sludge treatment tank S11 is filled with activated sludge for the activated sludge treatment.

A first passage S12 and a second passage S13 are connected to the activated sludge treatment tank S11. The first passage S12 is a passage through which raw water discharged from factories or households is caused to flow into the activated sludge treatment tank S11. The second passage S13 is a passage through which the sludge-containing treatment water (the target treatment water) discharged from the activated sludge treatment tank S11 is caused to flow into the membrane separation tank S21.

An air diffusion device S14 is provided inside the activated sludge treatment tank S11 to maintain an aerobic condition inside the tank.

The air diffusion device S14 includes an air diffusion pipe S14a which diffuses air inside the activated sludge treatment tank S11, an introduction pipe S14b which supplies air to the air diffusion pipe S14a, and a blower S14c which blows air.

The air diffusion pipe S14a is not particularly limited as long as air supplied from the blower S14c can be discharged upward, but for example, a single pipe with a hole or a membrane type pipe can be exemplified.

The membrane separation tank S21 is used to collect the activated sludge and the biological treatment water which is sent from the activated sludge treatment tank S11.

The membrane separation tank S21 includes a membrane bioreactor S100 (hereinafter, referred to as an "MBR device S100") according to an embodiment of the invention. The MBR device S100 will be described later.

A sludge carrying unit S30 is connected to the membrane separation tank S21 and the activated sludge treatment tank S11. The sludge carrying unit S30 is used to carry a part of the sludge-containing treatment water from the membrane separation tank S21 to the activated sludge treatment tank S11.

The sludge carrying unit S30 includes a fourth passage S31. The fourth passage S31 is a passage through which a part of the sludge-containing treatment water is discharged from the membrane separation tank S21 and is caused to flow into the activated sludge treatment tank S11.

The fourth passage S31 is provided with a pump S31a. Accordingly, a part of the sludge-containing treatment water inside the membrane separation tank S21 can be carried from the membrane separation tank S21 to the activated sludge treatment tank S11.

The treatment water tank S41 is used to store the treatment water obtained by performing a membrane separation treatment on the sludge-containing treatment water.

(Membrane Bioreactor)

The MBR device S100 includes a plurality of membrane modules S22 and a siphon-type air diffusion device S10 provided below the membrane module S22.

The membrane module S22 is used to perform a membrane separation treatment on the sludge-containing treatment water containing the activated sludge. The membrane module S22 includes a separation membrane and separates the sludge-containing treatment water into the biological treatment water and the activated sludge by a solid-liquid separation (membrane separation) treatment of the separation membrane.

The separation membrane is not particularly limited as long as a separation function is provided and, for example, a hollow fiber membrane, a flat membrane, a cylindrical membrane, a monolithic membrane, and the like can be exemplified. Among these, the hollow fiber membrane is desirable due to its high volume filling ratio.

When the hollow fiber membrane is used as the separation membrane, examples of the material thereof include cellulose, polyolefin, polysulfone, polyvinylidene fluoride (PVDF), polytetrafluoroethylene (PTFE), and the like. Among these, PVDF and PTFE are preferable as a material of the hollow fiber membrane from the viewpoint of the strongness to chemical resistance and pH change.

When the monolithic membrane is used as the separation membrane, it is preferable to use a ceramic membrane.

As the average hole diameter of fine holes formed in the separation membrane, the average hole diameter is about 0.001 µm to 0.1 µm in a membrane generally called an ultrafiltration membrane and is about 0.1 µm to 1 µm in a membrane generally called a precision separation membrane. In the embodiment, it is preferable to use the separation membrane of which the average hole diameter is within the above-described range.

The third passage S33 is connected to the membrane module S22. The third passage S33 is a passage through which the treatment water passing through the separation membrane is discharged from the membrane separation tank S21 and is caused to flow into the treatment water tank S41.

The third passage S33 is provided with a pump S33a. Accordingly, the treatment water passing through the separation membrane of the membrane module S22 can be discharged from the membrane separation tank S21.

As illustrated in FIGS. 9 to 13, the siphon-type air diffusion device S10 includes five siphon-type air diffusion pipes S1 which are arranged in series in the horizontal direction and an air supply member S50 that supplies air to each siphon-type air diffusion pipe S1.

The siphon-type air diffusion pipe S1 is a box-shaped casing which is formed by a combination of a plurality of plate-shaped members and includes an upper plate portion S1A, two side plate portions S1B, two side plate portions S1C, a bottom plate portion S1D, a first partition wall S4a, and a second partition wall S4b.

Each of two side plate portions S1B and two side plate portions S1C constituting each siphon-type air diffusion pipe S1 has a rectangular shape and the side plate portion S1B is wider than the side plate portion S1C. Two side plate portions S1B and two side plate portions S1C constituting each siphon-type air diffusion pipe S1 extend downward from the lower surfaces of the upper plate portions S1A so that the side plate portions S1B face each other and the side plate portions S1C face each other. A rectangular tube having a rectangular cross-section is formed by two side plate portions S1B and two side plate portions S1C. Five siphon-type air diffusion pipes S1 in the siphon-type air diffusion device S10 are connected so that the surfaces of the side plate portions S1C of the adjacent siphon-type air diffusion pipes S1 face each other.

Figure 12:
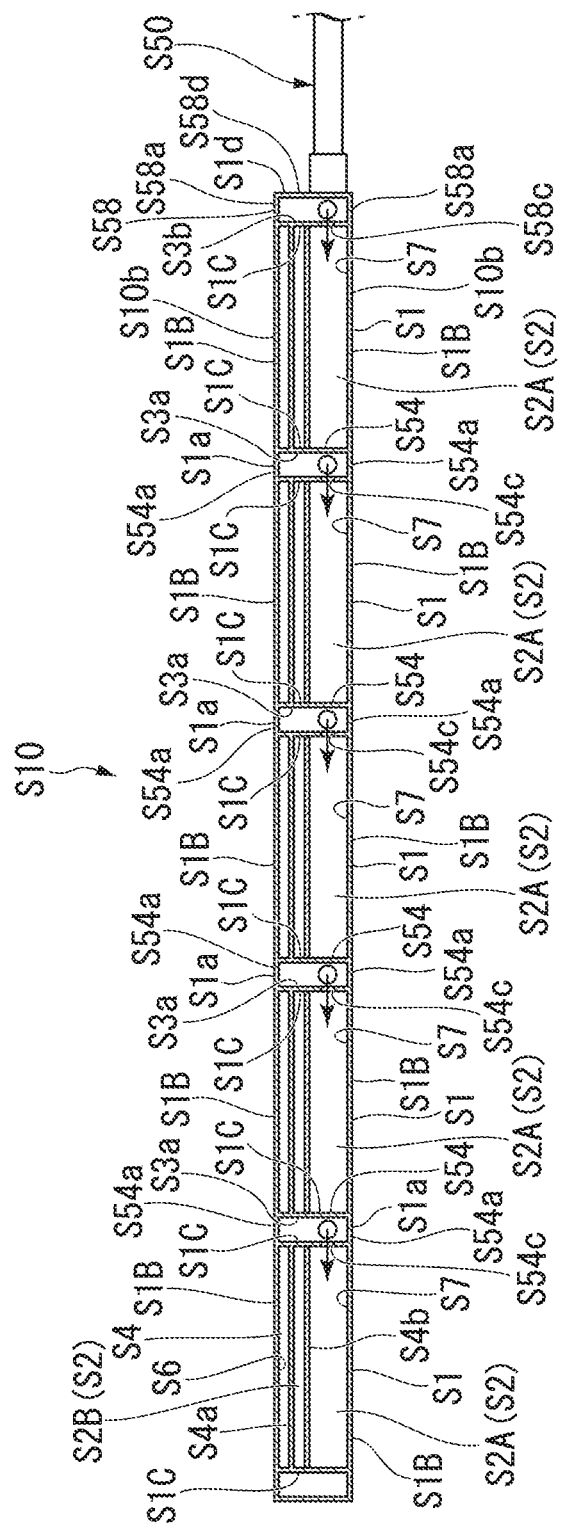
FIG. 12 is a cross-sectional view taken along a line I-I of the siphon-type air diffusion device of FIG. 9.
Figure 13:
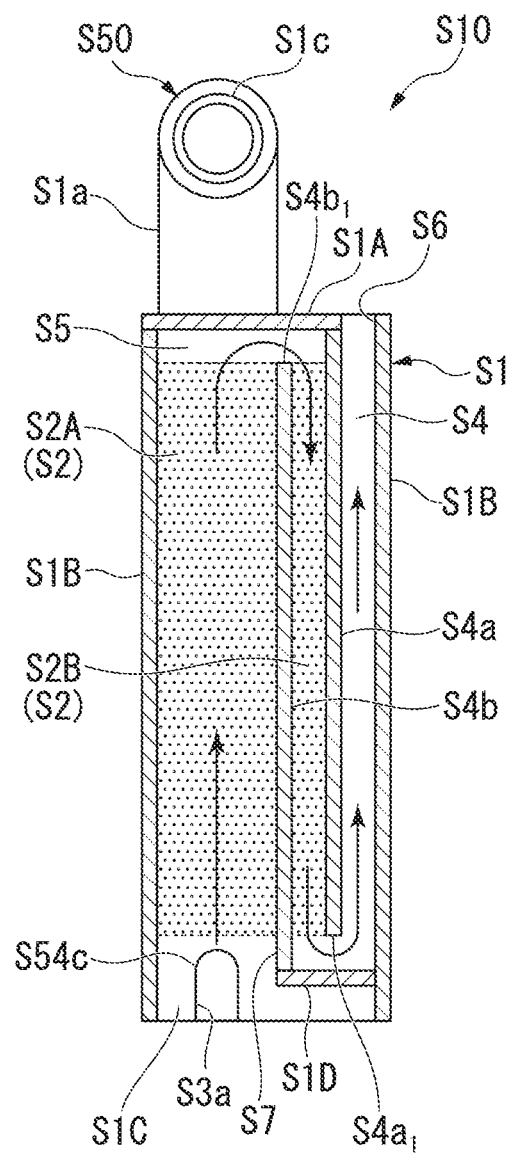
FIG. 13 is a cross-sectional view taken along a line II-II of the siphon-type air diffusion device of FIG. 9.

An air diffusion hole S6 which extends along the side plate portion S1B is formed at a portion close to one side plate portion S1B in each upper plate portion S1A. The first partition wall S4a has a rectangular shape in the front view and extends downward from the upper plate portion S1A so as to face the side plate portion S1B with the air diffusion hole S6 interposed therebetween as illustrated in FIGS. 12 and 13.

The bottom plate portion S1D extends inward from a portion close to the lower end of the side plate portion S1B on the side of a portion provided with the air diffusion hole S6. The length of the side plate portion S1C of the bottom plate portion S1D in the plane direction is shorter than that of the upper plate portion S1A. Almost a half of the lower opening portion of the rectangular tube formed by two side plate portions S1B and two side plate portions S1C is blocked by the bottom plate portion S1D and a portion not blocked by the bottom plate portion S1D in the opening portion becomes a treatment water inlet S7.

The second partition wall S4b extends upward from the end portion located at a position opposite to the air diffusion hole S6 of the first partition wall S4a in the bottom plate portion S1D. The first partition wall S4a and the second partition wall S4b face each other.

In the siphon-type air diffusion pipe S1, when a flow of wastewater from the treatment water inlet S7 toward the air diffusion hole S6 is assumed, a position on the side of the treatment water inlet S7 will be referred to as an "upstream" and a position on the side of the air diffusion hole S6 will be referred to as a "downstream".

The siphon chamber S2 is used to store air. The siphon chamber S2 indicates a space which is located on the side of the treatment water inlet S7 in relation to the first partition wall S4a inside the siphon-type air diffusion pipe S1 and has a height from an upper end $S4b_1$ of the second partition wall S4b to a lower end $S4a_1$ of the first partition wall S4a. The siphon chamber S2 is divided into a first siphon chamber S2A and a second siphon chamber S2B by the second partition wall S4b.

The upper portion of the first siphon chamber S2A and the upper portion of the second siphon chamber S2B communicate with each other by the communication portion S5. A portion from the second siphon chamber S2B to the air diffusion hole S6 inside the siphon-type air diffusion pipe S1 becomes a path S4. A part of the first partition wall S4a faces the siphon chamber S2 and the path S4. In other words, a part of the first partition wall S4a divides the siphon chamber S2 and the path S4. Further, a part of the second partition wall S4b faces the siphon chamber S2. The upper end $S4b_1$ of the second partition wall S4b is located above at least the lower end $S4a_1$ of the first partition wall S4a. The treatment water inlet S7 is formed at the bottom portion of the siphon-type air diffusion pipe S1 and is located below the lower end $S4a_1$ of the first partition wall S4a.

In this way, the first siphon chamber S2A, the communication portion S5, the second siphon chamber S2B, and the path S4 are formed in this order from the upstream toward the downstream inside the siphon-type air diffusion pipe S1. Then, the air diffusion hole S6 is formed at a position higher than the siphon chamber S2 of the path S4 at the downstream of the siphon chamber S2 of the siphon-type air diffusion pipe S1 and the treatment water inlet S7 is formed at the upstream of the siphon chamber S2. The outside of the siphon-type air diffusion pipe S1 communicates with the siphon chamber S2 by the treatment water inlet S7.

The plan view shape of the air diffusion hole S6 is an elongated rectangular shape extending in the arrangement direction of the siphon-type air diffusion pipe S1. The area of the plan view shape of the air diffusion hole S6 is preferably 40 $cm^2$ or less and more preferably 25 $cm^2$ or less and further preferably 20 $cm^2$ or less. Further, the length of the plan view shape of the air diffusion hole S6 in the longitudinal direction is preferably 40 cm or less, more preferably 25 cm or less, and further preferably 20 cm or less.

Further, in the embodiment, a ratio R (unit: m) calculated based on the following equation using the area of the plan view shape of the air diffusion hole S6 satisfies a condition of 0.6 or more. Further, the ratio R is preferably 0.61 or more and more preferably larger than 0.67.

$R$=(Volume (unit: $m^3$) of siphon chamber)/(Area (unit: $m^2$) of plan view shape of air diffusion hole)

In this example, the number of the siphon-type air diffusion pipes S1 of the siphon-type air diffusion device 10 is five, but can appropriately set in response to the size and the number of the membrane module S22. The number may by four or less or six or more.

The material of the siphon-type air diffusion pipe S1 is not particularly limited, and examples thereof include polyethylene, polypropylene, AS resin, ABS resin, acrylic resin (PMMA), polyvinyl chloride resin (PVC), polyacetal resin (POM), polyamide resin (PA), polyethylene terephthalate resin (PET), polybutylene terephthalate resin (PBT), polycarbonate resin (PC), modified polyphenylene ether resin (PPE), polyphenylene sulfide resin (PPS), polyetheretherketone resin (PEEK), polysulfone Resin (PSF), polyether sulfone resin (PES), and the like. The material of the siphon-type air diffusion pipe S1 may be one kind or a combination of two kinds or more. Further, a metal such as stainless steel (SUS 304 series, SUS 316 series) or the like may be used.

The air supply member S50 includes, as illustrated in FIGS. 8 to 13, a distribution pipe S1c, a blower S1b which sends air to the distribution pipe S1c, four introduction portions S1a which are branched from the distribution pipe S1c, and one introduction portion S1d which is branched from the distribution pipe S1c.

The distribution pipe S1c is located above each siphon-type air diffusion pipe S1 so as to extend in the longitudinal direction of the siphon-type air diffusion device S10, that is, the arrangement direction of five siphon-type air diffusion pipes S1. The distribution pipe S1c is located on the end portion opposite to the air diffusion hole S6 in the width direction of the siphon-type air diffusion pipe S1 in the plane view.

The cross-sectional area of the distribution pipe S1c is formed to be larger than the cross-sectional areas of the introduction portions S1a and S1d to be described later. The cross-sectional shape of the distribution pipe S1c is not particularly limited. For example, when the cross-sectional shape of the distribution pipe S1c is a circular shape, the inner diameter of the distribution pipe S1c is preferably 10 mm or more and 60 mm or less.

The distribution pipe S1c is not particularly limited and, for example, pipes and tubes made of resin such as polyvinyl chloride, polyethylene, polypropylene, fluorocarbon resin (PTFE, PVDF, PFA), nylon, and polyurethane and pipes made of metal such as stainless steel (SUS 304 series, SUS 316 series) can be exemplified. The material of the distribution pipe S1c may be one kind or a combination of two kinds or more.

Each of four introduction portions S1a is provided so as to be branched from a portion corresponding to a portion between the adjacent siphon-type air diffusion pipes S1 of the distribution pipe S1c and to extend in the vertical direction between the adjacent siphon-type air diffusion pipes S1. Each introduction portion S1a includes a tubular branch pipe portion S52 which is branched from the distribution pipe S1c and a lower cylinder portion S54 which is provided at a position on the side of the lower end of the branch pipe portion S52.

The lower cylinder portion S54 is a cylindrical portion including two side plate portions S1C which face each other in the adjacent siphon-type air diffusion pipes S1, two side plate portions S54a which are provided to connect the end portions of the side plate portions S1C, and a top plate portion S54b which is provided to block an upper opening end formed in a rectangular cylindrical shape by two side plate portions S1C and two side plate portions S54a. The lower end portion of the branch pipe portion S52 is connected to the top plate portion S54b so that the inside of the branch pipe portion S52 communicates with the inside of the lower cylinder portion S54. In each introduction portion S1a, the pair of the pair of side plate portions S54a and the top plate portion S54b which constitute the lower cylinder portion S54 are integrated with the adjacent siphon-type air diffusion pipes S1.

In the lower cylinder portion S54 of this example, the side plate portions S1C of the adjacent siphon-type air diffusion pipes S1 are used as the side plates connecting the side ends of the pair of side plate portions S54a. That is, in this example, the lower cylinder portion S54 and the siphon-type air diffusion pipe S1 adjacent to the lower cylinder portion S54 respectively share the side plate portion S1C.

The lower end of the lower cylinder portion S54 is formed as an opening end. Further, a notch portion S54c is formed at the lower end portion of the side plate portion S1C shared with the siphon-type air diffusion pipe S1 as the downstream side plate of the lower cylinder portion S54 of each introduction portion S1a. That is, the notch portion S54c is formed at a portion facing the treatment water inlet S7 of the downstream siphon-type air diffusion pipe S1 at an end portion opposite to the distribution pipe S1c in the introduction portion S1a. In the introduction portion S1a, an air supply port S3a is formed by the notch portion S54c and the opening end of the lower end of the lower cylinder portion S54.

Each introduction portion S1a is configured to supply air from each air supply port S3a to the siphon chamber S2 of the siphon-type air diffusion pipe S1 at the downstream side of each introduction portion S1a through the treatment water inlet S7.

Furthermore, one or more air supply ports may be provided in the side plate portion S1C in addition to the notch portion S54c. Here, when one or more air supply ports are provided in addition to the notch portion S54c, the air supply port located at the uppermost position in the vertical direction among the air supply ports provided in addition to the notch portion S54c is provided below the lower end of the partition wall dividing the siphon chamber and the path.

The minimum passage cross-sectional area when the introduction portion S1a is cut in a direction perpendicular to the longitudinal direction is preferably 20 mm$^2$ to 350 mm$^2$, more preferably 28 mm$^2$ to 200 mm$^2$, further preferably 35 mm$^2$ to 100 mm$^2$, and particularly preferably 40 mm$^2$ to 60 mm$^2$. When the minimum passage cross-sectional area of the introduction portion S1a is the lower limit value or more of the above-described range, the inside of the introduction portion S1a is not easily blocked by sludge. When the minimum passage cross-sectional area of the introduction portion S1a is the upper limit value or less of the above-described range, air is easily and uniformly distributed to the siphon-type air diffusion pipes S1.

Furthermore, the minimum passage cross-sectional area means the cross-sectional area means a cross-sectional area in a minimum passage cross-sectional area portion in which the passage cross-sectional area of the introduction portion is minimal.

A minimum passage cross-sectional area portion (not illustrated) of the introduction portion S1a may be provided in at least one arbitrary position in the height direction. From the viewpoint of preventing the blockage due to the inflow of the sludge, it is preferable to provide the minimum passage cross-sectional area portion at a high position of the introduction portion S1a as much as possible.

The front view shape of the notch portion S54c is formed in a shape which protrudes in a circular-arc shape so that an upper portion of a rectangular shape protrudes upward. Furthermore, the front view shape of the notch portion S54c is not limited to the above-described shape and may be, for example, a triangular shape, a semi-circular shape, a rectangular shape, or the like. Among these, it is preferable that the front view shape of the notch portion S54c be a shape which is narrowed as it goes upward. The upper portion of the notch portion S54c is more easily clogged by the sludge, but when the notch portion S54c is formed in a shape which is narrowed as it goes upward, air can be easily and efficiently supplied from a wide lower portion into the siphon-type air diffusion pipe S1 even when the upper portion of the notch portion S54c is clogged by the sludge. Specifically, it is preferable that the front view shape of the notch portion S54c be a triangular shape or a semi-circular shape in addition to the shape of which the rectangular upper portion protrudes upward in a circular-arc shape as in this example.

The uppermost portion of the notch portion S54c in the vertical direction is provided below the lower end S4$a_1$ of the first partition wall S4a. Further, it is preferable that the uppermost portion of the notch portion S54c in the vertical direction be provided above the lower end of the path S4.

Regarding the width of the notch portion S54c in the front view, the maximum width of the notch portion is preferably 4 to 30 mm and more preferably 8 to 20 mm. When the maximum width of the notch portion S54c is the upper limit value or less of the above-described range, air can be easily and efficiently supplied into the siphon-type air diffusion pipe S1. When the maximum width of the notch portion S54c is the lower limit value or more of the above-described range, the blockage of the notch portion due to the sludge hardly occurs.

The introduction portion S1d is branched from the upstream side of the siphon-type air diffusion pipe S1 located at the most upstream side of the distribution pipe S1c and extends in the vertical direction along the outside of the side plate portion S1C of the siphon-type air diffusion pipe S1. The introduction portion S1d includes a tubular branch pipe portion S56 which is branched from the distribution pipe S1c and a lower cylinder portion S58 which is provided on the side of the lower end of the branch pipe portion S56.

The lower cylinder portion S58 is a cylindrical portion including the side plate portion S1C which is on the upstream side of the siphon-type air diffusion pipe S1 located at the most upstream side, two rectangular side plate portions S58a which respectively extend outward from both end portions of the side plate portion S1C in the longitudinal direction of the distribution pipe S1c, a side plate portion S58d which is provided to connect the end portions distant from the side plate portion S1C in two side plate portions S58a, and a top plate portion S58b which is provided to block an upper opening end of a rectangular cylinder formed by the side plate portion S1C, two side plate portions S58a, and the side plate portion S58d. The lower end portion of the branch pipe portion S56 is connected to the top plate portion S58b so that the inside of the branch pipe portion S56 communicates with the inside of the lower cylinder portion S58. In the introduction portion S1d, the pair of side plate portions S58a and the top plate portion S58b constituting the lower cylinder portion S58 are integrated with the adjacent siphon-type air diffusion pipes S1.

In the lower cylinder portion S58 of this example, the side plate portions S1C of the adjacent siphon-type air diffusion pipes S1 are used as the side plate connecting one side ends of the pair of side plate portions S58a. That is, in this example, the lower cylinder portion S58 and the siphon-type air diffusion pipes S1 adjacent to the lower cylinder portion S58 share the side plate portion S1C.

The lower end of the lower cylinder portion S58 is formed as an opening end. Further, a notch portion S58c is formed at the lower end portion of the side plate portion S1C shared with the siphon-type air diffusion pipe S1 as the downstream side plate of the lower cylinder portion S58 in the introduction portion S1d. That is, the notch portion S58c is formed at a portion facing the treatment water inlet S7 of the downstream siphon-type air diffusion pipe S1 at an end portion opposite to the distribution pipe S1c in the introduction portion S1d. In the introduction portion S1d, an air supply port S3b is formed by the notch portion S58c and the opening end of the lower end of the lower cylinder portion S58.

The introduction portion S1d is configured to supply air from the air supply port S3b to the siphon chamber S2 of the downstream siphon-type air diffusion pipe S1 of the introduction portion S1d through the treatment water inlet S7.

A preferable embodiment of the minimum passage cross-sectional area of the introduction portion S1d is the same as a preferable embodiment of the minimum passage cross-sectional area of the introduction portion S1a.

As illustrated in FIG. 13, the front view shape of the notch portion S58c is formed in a shape which protrudes in a circular-arc shape so that an upper portion of a rectangular shape protrudes upward. Furthermore, the front view shape of the notch portion S58c is not limited to the above-described shape and may be, for example, a triangular shape, a semi-circular shape, a rectangular shape, or the like.

A preferable embodiment of the front view shape and the area of the notch portion S58c is the same as a preferable embodiment of the notch portion S54c.

Figure 10:
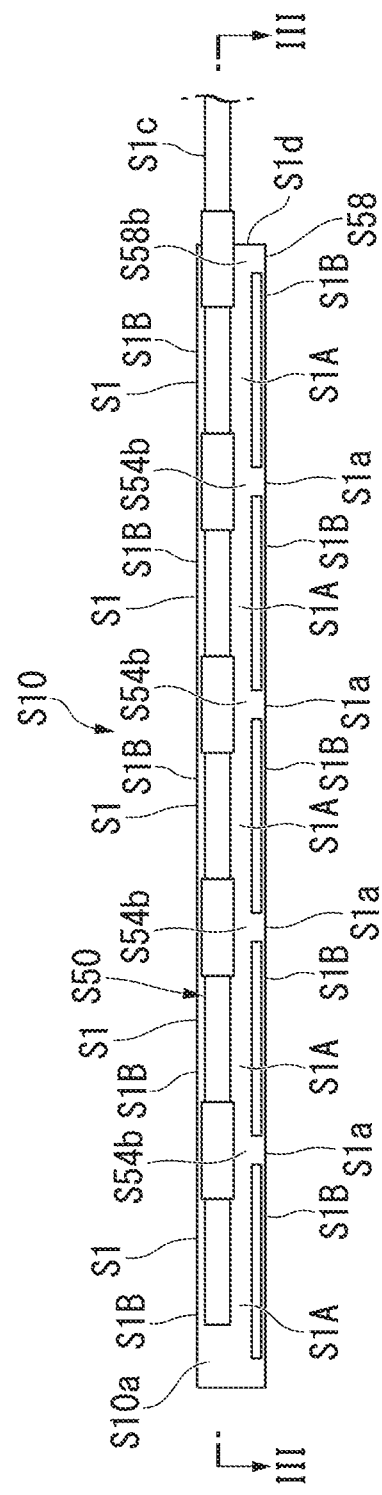
FIG. 10 is a front view of the siphon-type air diffusion device of FIG. 9.
Figure 11:
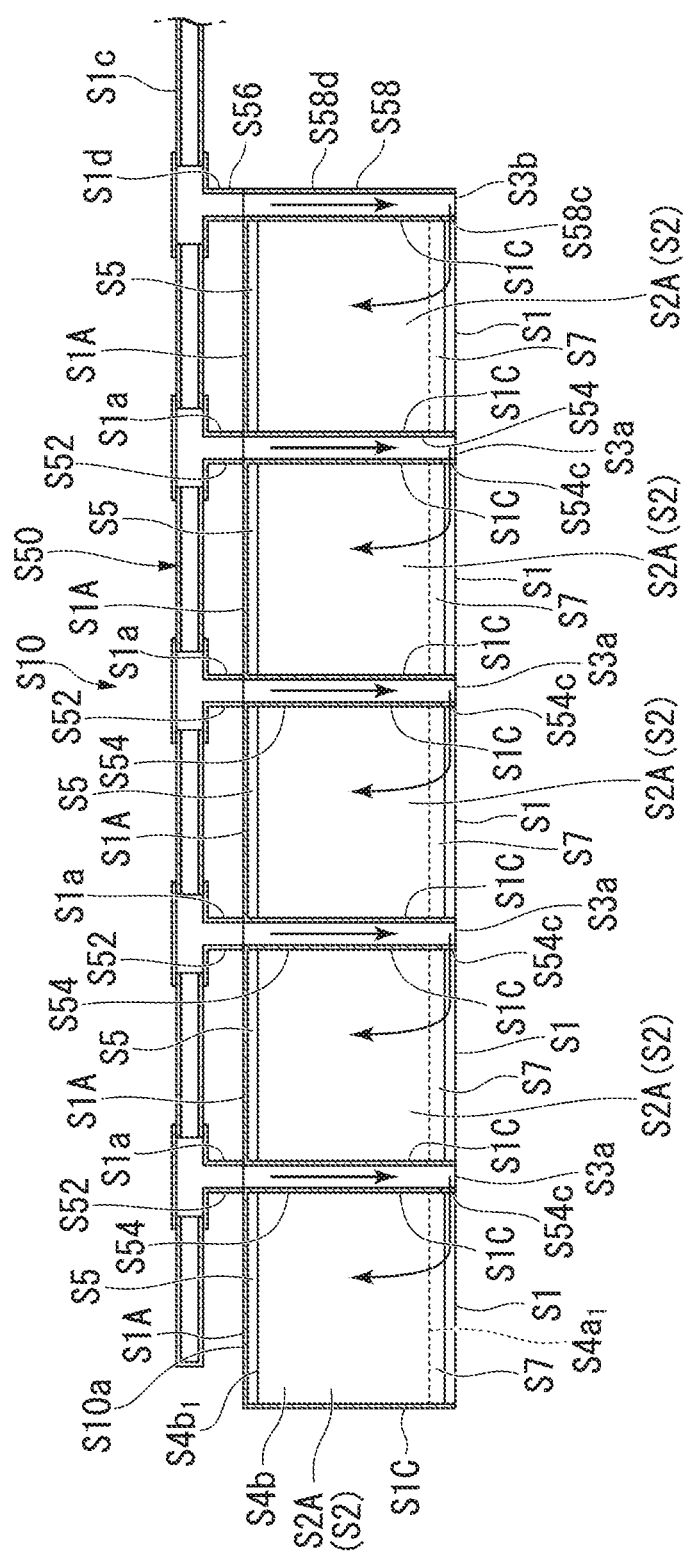
FIG. 11 is a cross-sectional view taken along a line of the siphon-type air diffusion device of FIG. 10.

As described above, in the siphon-type air diffusion device S10, as illustrated in FIG. 10, the upper plate portion S1A of each siphon-type air diffusion pipe S1, the top plate portion S54b of each introduction portion S1a, and the top plate portion S58b of the introduction portion S1d are integrated and these members are formed by the top plate S10a having an elongated rectangular shape in the plan view. Further, as illustrated in FIG. 12, the side plate portion S1B of each siphon-type air diffusion pipe S1, the side plate portion S54a of each introduction portion S1a, and the side plate portion S58a of the introduction portion S1d located on the same side of the siphon-type air diffusion device S10 are integrated and these members are formed by the side plate portion S10b having an elongated rectangular shape in the plan view.

In this way, in the siphon-type air diffusion device S10, the siphon-type air diffusion pipes S1 are integrated. Accordingly, since it is not necessary to align the air supply ports S3a and S3b of the introduction portions S1a and S1d in the vertical direction or align the siphon-type air diffusion pipes S1 in the vertical direction, it is easy to uniformly diffuse air from each siphon-type air diffusion pipe S1. Further, since the assembly operation of the siphon-type air diffusion device S10 is easy and the number of components can be decreased, there is an advantage in cost.

The materials of the introduction portions S1a and S1d are not particularly limited and, for example, the same material as that of the siphon-type air diffusion pipe S1 can be exemplified. The materials of the introduction portions S1a and S1d may be one kind or a combination of two or more kinds.

Since the distribution pipe S1c is located above each siphon-type air diffusion pipe S1, the distribution pipe is located above the air supply port S3a of each introduction portion S1a and the air supply port S3b of the introduction portion S1d. Accordingly, since it is possible to prevent air from being supplied only to the upstream siphon-type air diffusion pipe S1 close to the blower S1b in the air supply member S50 and to uniformly supply air to the plurality of siphon-type air diffusion pipes S1, it is possible to uniformly diffuse air from each of the siphon-type air diffusion pipes S1.

It is preferable to provide the siphon-type air diffusion device S10 at a position in which a gap between the adjacent separation membranes of the membrane module S22 overlaps the air diffusion hole S6 of each siphon-type air diffusion pipe S1 when the membrane separation tank S21 is viewed from above. Furthermore, the siphon-type air diffusion device S10 may be provided so that the air diffusion hole S6 of the siphon-type air diffusion pipe S1 intersects the membrane module S22 when the membrane separation tank S21 is viewed from above.

Hereinafter, an air diffusion mechanism of the siphon-type air diffusion pipe S1 will be described.

Figure 14:
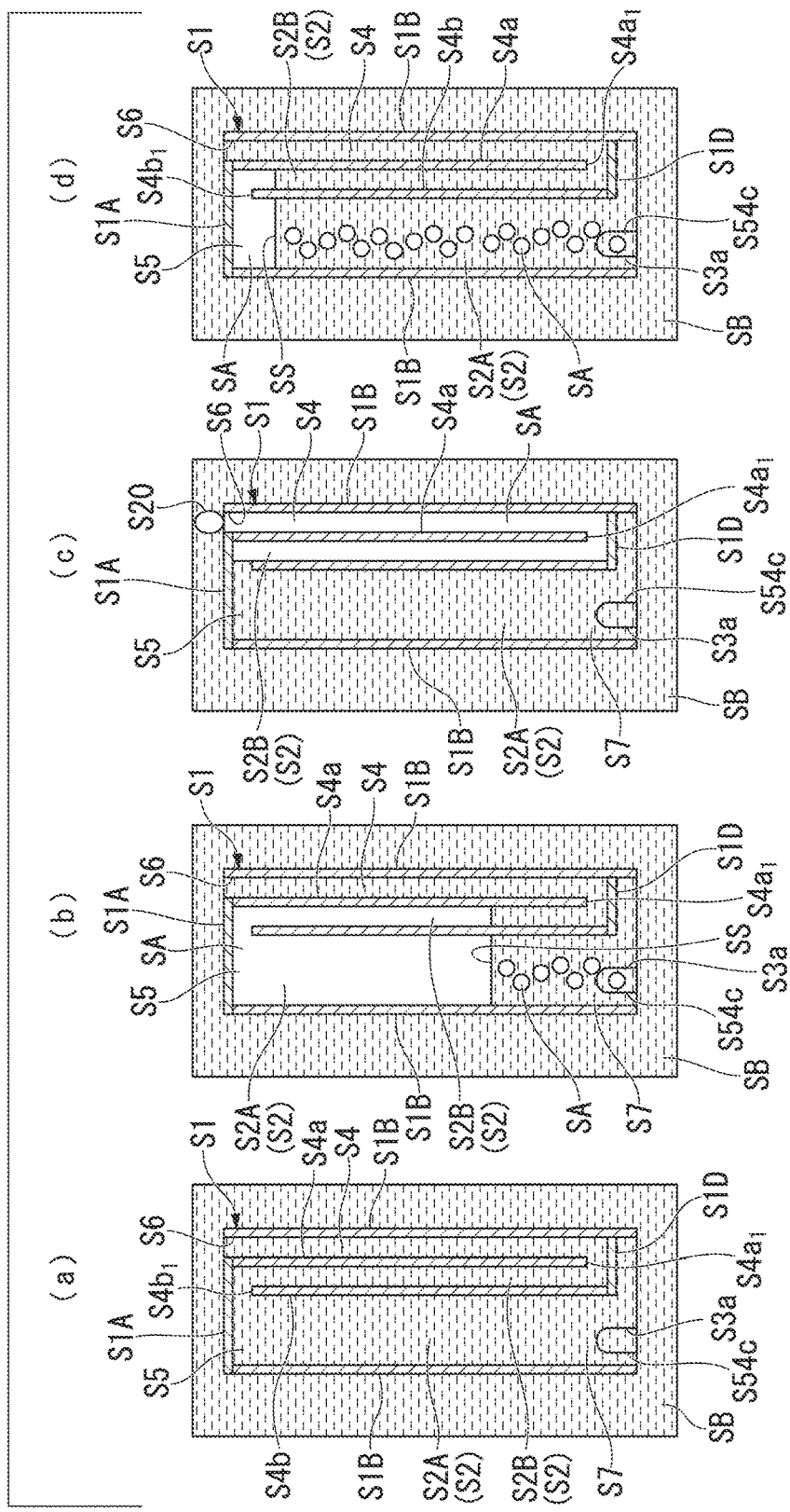
FIG. 14 is a cross-sectional view illustrating an operation mechanism of the siphon-type air diffusion pipe.

Before an operation starts, as illustrated in FIG. 14(a), the siphon chamber S2, the communication portion S5, and the path S4 inside the siphon-type air diffusion pipe S1 are filled with the sludge-containing treatment water SB (the target treatment water). Air is sent from the blower S1b of the air supply member S50 to the distribution pipe S1c and the air SA distributed from the distribution pipe S1c to each of the introduction portions S1a and S1d is continuously supplied from the air supply ports S3a and S3b to the siphon chamber S2 inside each siphon-type air diffusion pipe S1. When the air SA is continuously supplied from the air supply ports S3a and S3b, as illustrated in FIG. 14(b), the sludge-containing treatment water SB inside the siphon chamber S2 is pushed out from the air diffusion hole S6 or the treatment water inlet S7 so that a liquid level SS of the siphon chamber S2 gradually falls.

When the air SA is further continuously supplied from the air supply ports S3a and S3b so that the height of the liquid level SS becomes lower than the lower end $S4a_1$ of the first partition wall S4a, the air SA moves to the path S4 due to a difference in height between the two gas-liquid interfaces of the path S4 and the first siphon chamber S2A and is discharged from the air diffusion hole S6 at one to form bubbles S20 as illustrated in FIG. 14(c). When air is diffused from the air diffusion hole S6, the sludge-containing treatment water SB flows from the treatment water inlet S7 so that the height of the liquid level SS rises to the vicinity of the upper end $S4b_1$ of the second partition wall S4b as illustrated in FIG. 14(d). Then, aeration is intermittently performed when the states of FIGS. 14(b) to 14(d) are repeated.

As described above, in the siphon-type air diffusion device in which the introduction pipe branched from the distribution pipe is directly connected to each of the plurality of siphon-type air diffusion pipes to supply air, particularly when the flow rate of the air is small, there is a case in which bubbles discharged from any of the siphon-type air diffusion pipe unexpectedly become small or air is not diffused whenever air is diffused from each of the siphon-type air diffusion pipes. As a result, it is difficult to uniformly diffuse air from each of the siphon-type air diffusion pipes.

An example of a conventional siphon-type air diffusion device S210 exemplified in FIG. 19 will be described in detail. The siphon-type air diffusion device S210 includes three siphon-type air diffusion pipes S201X, S201Y, and S201Z which are arranged in the horizontal direction and an air supply member S250 that is provided above each of the siphon-type air diffusion pipes S201X, S201Y, and S201Z and supplies air to each of the siphon-type air diffusion pipes S201X, S201Y, and S201Z.

The air supply member S250 includes a distribution pipe S201c which is provided above each of the siphon-type air diffusion pipes S201X, S201Y, and S201Z, a blower which sends air to the distribution pipe S201c, and three introduction pipes S201aX, S201aY, and S201aZ which are branched downward from the distribution pipe S201c. Each of the siphon-type air diffusion pipes S201X, S201Y, and S201Z has the same embodiment as that of the siphon-type air diffusion pipe S1 except that an air supply port S203 is provided at a portion facing a communication portion S205 in the upper portion thereof. Three introduction pipes S201aX, S201aY, and S201aZ are respectively directly connected to the air supply ports S203 of the siphon-type air diffusion pipes S201X, S201Y, and S201Z.

In the siphon-type air diffusion device S210, there is a case in which the air diffusion timings of the siphon-type air diffusion pipes S201X, S201Y, and S201Z are different since the height of the liquid level SS inside each siphon chamber S202 becomes non-uniform due to the influence of the installation height difference of the siphon-type air diffusion pipes S201X, S201Y, and S201Z caused by the fluctuation of the liquid level SS inside the siphon chamber S202, the installation gradient, and the device manufacturing error.

For example, if a portion having the air SA inside the siphon-type air diffusion pipe S201X has a negative pressure when the air SA therein is discharged in a case in which the air diffusion timing of the siphon-type air diffusion pipe S201X is faster than those of the siphon-type air diffusion pipes S201Y and S201Z, the air of the distribution pipe S201c and each of the introduction pipes S201aX, S201aY, and S201aZ is guided into the siphon-type air diffusion pipe S201X. Accordingly, when the distribution pipe S201c and the introduction pipes S201aX, S201aY, and S201aZ are depressurized particularly in a case in which the flow rate of the air from the blower is small, the air SA in the siphon-type air diffusion pipes S201Y and S201Z flows reversely through the introduction pipes S201aY and S201aZ. In this way, in the siphon-type air diffusion pipes S201Y and S201Z, since a part of the air SA diffused through the path S204 flows reversely through the introduction pipes S201aY and S201aZ, the discharged bubbles become small or no bubble is discharged.

Further, even when the air diffusion timing of any one of the siphon-type air diffusion pipe S201Y and the siphon-type air diffusion pipe S201Z is fast, bubbles discharged from the same mechanism become small or no bubble is discharged in the siphon-type air diffusion pipe in which the air diffusion timing is slow.

Figure 15:
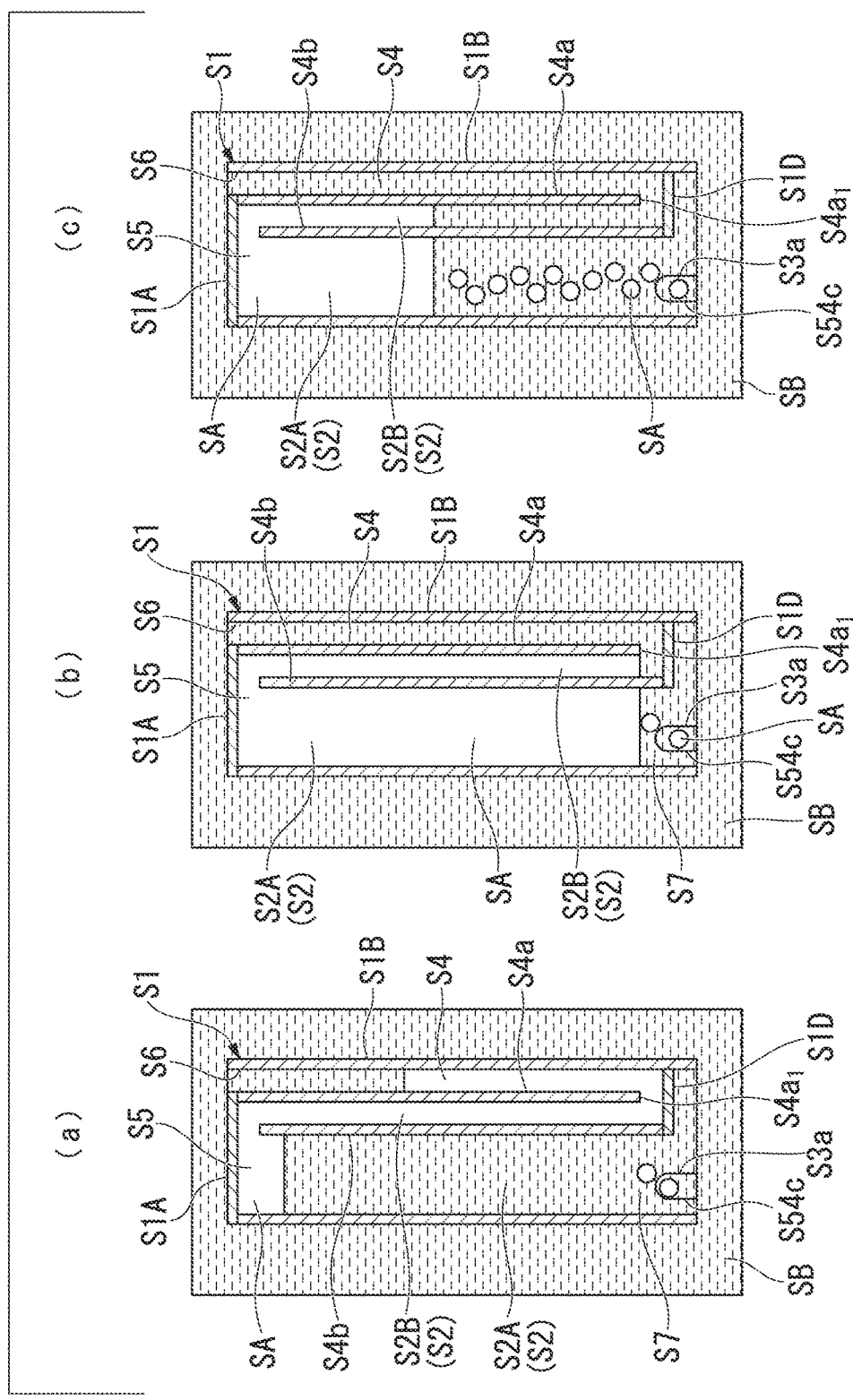
FIG. 15 is a cross-sectional view illustrating an operation mechanism of the siphon-type air diffusion device of the second embodiment of the invention.

In contrast, in the siphon-type air diffusion device S10 of the embodiment, the air SA is supplied from the air supply port S3a of the introduction portion S1a or the air supply port S3b of the introduction portion S1d disposed between the siphon-type air diffusion pipes S1 to the siphon chamber S2 of each siphon-type air diffusion pipe S1 through the treatment water inlet S7 on the downstream side of the siphon chamber S2. In this way, the air SA is supplied from the outside introduction portions S1a and S1d of the siphon-type air diffusion pipes S1 to the siphon chamber S2 inside the siphon-type air diffusion pipe S1. For that reason, the air supply ports S3a and S3b of the introduction portions S1a and S1d exist in a portion normally filled with the sludge-containing treatment water SB during the operation of the siphon-type air diffusion device S10. Accordingly, as illustrated in FIG. 15, even when the air diffusion timing of any one of the siphon-type air diffusion pipes S1 (FIG. 15(a)) becomes faster than that of the other siphon-type air diffusion pipe S1 (FIG. 15(b) and FIG. 15(c)) so that a portion having the air SA inside the siphon-type air diffusion pipe S1 having a fast timing has a negative pressure, the negative pressure does not influence the other siphon-type air diffusion pipes S1 through the introduction portions S1a and S1d. As a result, even when the flow rate of air is small, the air SA does not flow reversely in the siphon-type air diffusion pipe S1 having a slow air diffusion timing and the bubbles discharged from the siphon-type air diffusion pipe S1 are prevented from becoming unexpectedly small. As a result, it is possible to uniformly diffuse air from the plurality of siphon-type air diffusion pipes S1.

Further, the air SA is supplied from the introduction portions S1a and S1d disposed outside the siphon-type air diffusion pipe S1 through the air supply ports S3a and S3b, but the air supply ports S3a and S3b of the introduction portions S1a and S1d do not exist at a portion in which the air SA is gathered inside the siphon-type air diffusion pipe S1. For this reason, it is possible to prevent the blockage of the air supply ports S3a and S3b when the sludge adhering to the air supply ports S3a and S3b is dried and solidified.

As described above, in the invention, in the air supply member of the siphon-type air diffusion device, the introduction portion branched from the distribution pipe is located between the adjacent siphon-type air diffusion pipes and air is supplied from the outside of the siphon-type air diffusion pipe to the siphon chamber through the treatment water inlet by the use of the introduction portion. For that reason, even when the air diffusion timings of the plurality of siphon-type air diffusion pipes are different, the air does not flow reversely inside the siphon-type air diffusion pipe having a slow air diffusion timing and the air can be uniformly diffused from the plurality of siphon-type air diffusion pipes. Further, it is possible to prevent the blockage of the air supply port of the introduction portion.

Figure 16:
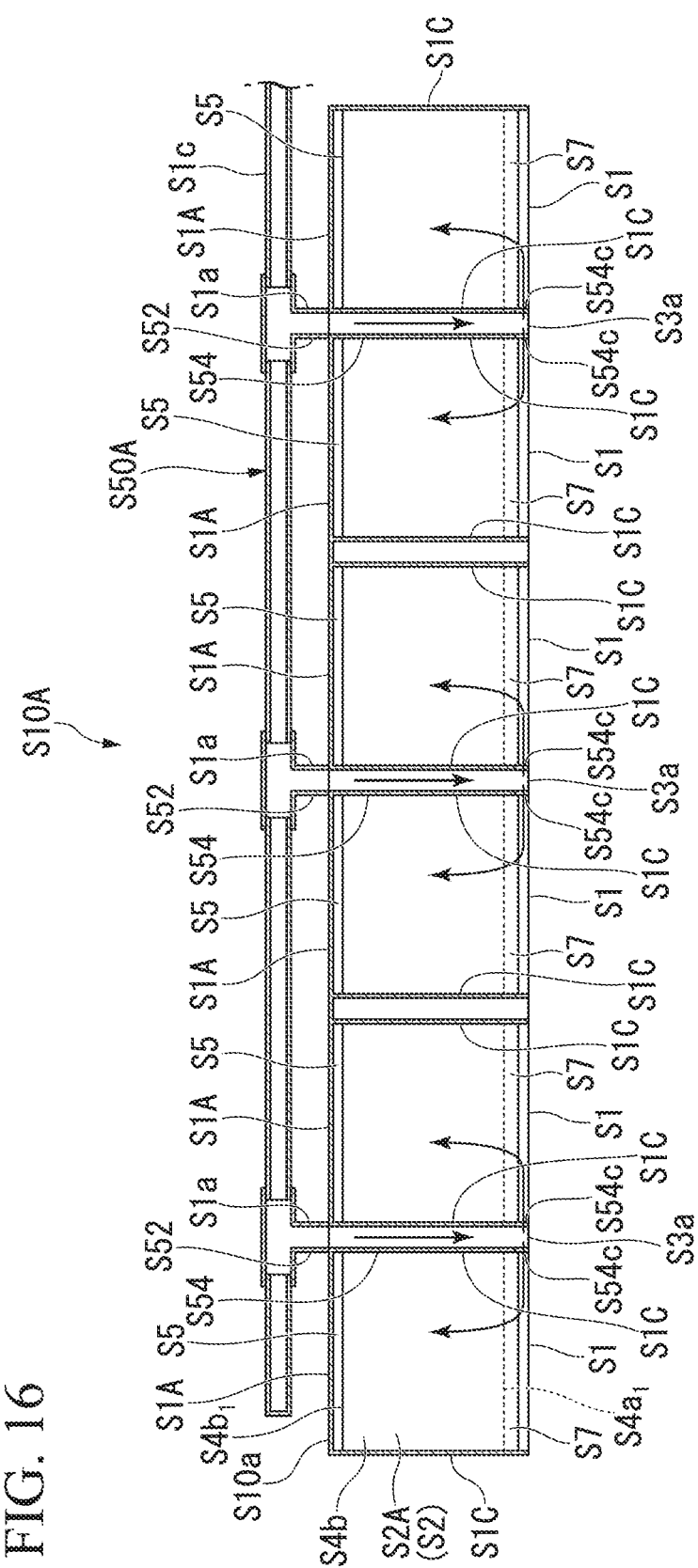
FIG. 16 is a cross-sectional view illustrating another example of the siphon-type air diffusion device of the second embodiment of the invention.

Furthermore, the siphon-type air diffusion device of the invention is not limited to the siphon-type air diffusion device S10. For example, the siphon-type air diffusion device of the invention may be used to supply air from the introduction portion to the siphon chambers of at least two siphon-type air diffusion pipes adjacent to the introduction portion. Specifically, for example, a siphon-type air diffusion device S10A illustrated in FIG. 16 may be used. The same parts as those in FIG. 11 in FIG. 16 are indicated by the same reference numerals and a description thereof is omitted.

The siphon-type air diffusion device S10A includes six siphon-type air diffusion pipes S1 which are arranged in series in the horizontal direction and an air supply member S50A that supplies air to each siphon-type air diffusion pipe S1. The air supply member S50A includes the distribution pipe S1c and three introduction portions S1a branched from the distribution pipe S1c. In the siphon-type air diffusion device S10A, when six siphon-type air diffusion pipes S1 are formed into three sets so that each set includes two siphon-type air diffusion pipes S1 from the upstream side, each introduction portion S1a is branched from a portion corresponding to a gap between the adjacent siphon-type air diffusion pipes S1 of each set in the distribution pipe S1c and extends in the vertical direction between the adjacent siphon-type air diffusion pipes S1.

Six siphon-type air diffusion pipes S1 are integrated similarly to the siphon-type air diffusion device S10. Further, the notch portion S54c is formed at the lower end portion of the side plate portion S1C shared with the adjacent siphon-type air diffusion pipes S1 as the upstream and downstream side plates of the lower cylinder portion S54 of each introduction portion S1a. That is, the notch portion S54c is formed at a portion facing the treatment water inlets S7 of the upstream and downstream siphon-type air diffusion pipes S1 at the end portion opposite to the distribution pipe S1c in the introduction portion S1a. Accordingly, each introduction portion S1a is configured to supply air from each air supply port S3a to the siphon chambers S2 of the adjacent siphon-type air diffusion pipes S1 of the introduction portions S1a through the treatment water inlet S7.

An embodiment of the siphon-type air diffusion device S10A other than the above-described parts is the same as the embodiment of the siphon-type air diffusion device S10.

Also in the siphon-type air diffusion device S10A, similarly to the siphon-type air diffusion device S10, even when the flow rate of air is small, the air does not flow reversely inside the siphon-type air diffusion pipe S1 having a slow air diffusion timing and the bubbles discharged from the siphon-type air diffusion pipe S1 are prevented from becoming unexpectedly small. As a result, it is possible to uniformly diffuse air from the plurality of siphon-type air diffusion pipes S1. Further, it is possible to prevent the blockage of the air supply port S3a when the sludge adhering to the air supply port S3a of the introduction portion S1a is dried and solidified.

Further, similarly to the siphon-type air diffusion device S10A, since an embodiment of supplying air from one introduction portion S1a to the adjacent siphon-type air diffusion pipe S1 can decrease the number of air introduction parts by decreasing the number of introduction portions S1a as compared with an embodiment providing one introduction portion S1a in one siphon-type air diffusion pipe S1 as in the siphon-type air diffusion device S10, it is advantageous in that air can be uniformly supplied to the siphon-type air diffusion pipes S1.

Figure 17:
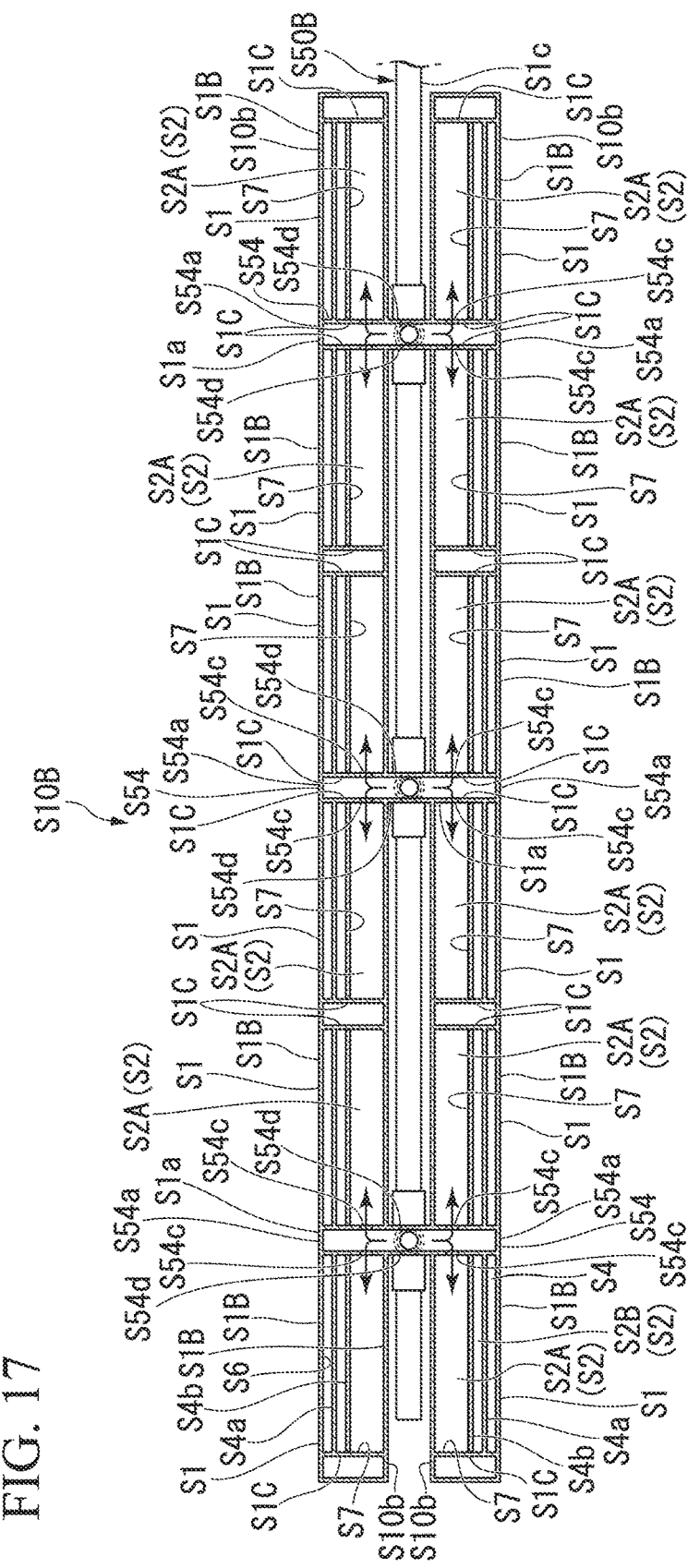
FIG. 17 is a cross-sectional view illustrating another example of the siphon-type air diffusion device of the second embodiment of the invention.

Further, the siphon-type air diffusion device of the invention may be a siphon-type air diffusion device S10B illustrated in FIG. 17. The same parts as those in FIG. 12 in FIG. 17 are indicated by the same reference numerals and a description thereof is omitted.

The siphon-type air diffusion device S10B includes a total of twelve siphon-type air diffusion pipes S1 which are arranged such that six siphon-type air diffusion pipes are arranged in parallel in two rows in the horizontal direction and an air supply member 550B which supplies air to each siphon-type air diffusion pipe S1.

The air supply member 550B includes the distribution pipe S1c and three introduction portions S1a branched from the distribution pipe S1c. The distribution pipe S1c of the air supply member S50B is disposed to extend along the longitudinal direction in which six siphon-type air diffusion pipes S1 are arranged between two rows of six siphon-type air diffusion pipes S1 in the plan view. In the siphon-type air diffusion device SLOB, when twelve siphon-type air diffusion pipes S1 are formed into three sets so that each set includes a total of four siphon-type air diffusion pipes S1 disposed so that two siphon-type air diffusion pipes S1 are disposed in each row from the upstream side, each introduction portion S1a is branched from a portion corresponding to a portion between the adjacent siphon-type air diffusion pipes S1 of each row of each set in the distribution pipe S1c. In the siphon-type air diffusion device S10B, four siphon-type air diffusion pipes S1 are arranged around one introduction portion S1a in the plan view.

Twelve siphon-type air diffusion pipes S1 and three introduction portions S1a of the air supply member S50B are integrated similarly to the siphon-type air diffusion device S10.

The lower cylinder portion S54 of each introduction portion S1a is provided with two side plate portions S54d which connect close end portions of the side plate portions S1C of two siphon-type air diffusion pipes S1 corresponding to each other in the row positions in the longitudinal direction of the row. Further, two side plate portions S54a are provided to connect end portions distant from the distribution pipes S1c of two side plate portions S1C facing each other in two siphon-type air diffusion pipes S1 adjacent to each other in each row. The lower cylinder portion S54 of each introduction portion S1a is formed in a rectangular cylindrical shape by the side plate portion S1C on the side of the introduction portions S1a of four siphon-type air diffusion pipes S1 disposed around the introduction portions S1a, two side plate portions S54d, and two side plate portions S54a. Further, the lower cylinder portion S54 of each introduction portion S1a extends in the vertical direction between the adjacent siphon-type air diffusion pipes S1 of the rows.

Further, the notch portion S54c is formed at the lower end portion of the side plate portion S1C shared with four siphon-type air diffusion pipes S1 as the upstream and downstream side plates of the lower cylinder portion S54 of each introduction portion S1a. That is, the notch portion S54c is formed at a portion facing the treatment water inlets S7 of four peripheral siphon-type air diffusion pipes S1 at the end portion opposite to the distribution pipe S1c of the introduction portion S1a. Accordingly, each introduction portion S1a is configured to supply air from each air supply port S3a to the siphon chambers S2 of four peripheral siphon-type air diffusion pipes S1 of each introduction portion S1a through the treatment water inlet S7.

An embodiment of the siphon-type air diffusion device S10B other than the above-described parts is the same as the embodiment of the siphon-type air diffusion device S10.

Also in the siphon-type air diffusion device S10B, similarly to the siphon-type air diffusion device S10, even when the flow rate of air is small, the air does not flow reversely inside the siphon-type air diffusion pipe S1 having a slow air diffusion timing and the bubbles discharged from the siphon-type air diffusion pipe S1 are prevented from becoming unexpectedly small. As a result, it is possible to uniformly diffuse air from the plurality of siphon-type air diffusion pipes S1. Further, it is possible to prevent the blockage of the air supply port S3a when the sludge adhering to the air supply port S3a of the introduction portion S1a is dried and solidified.

Further, similarly to the siphon-type air diffusion device S10B, since an embodiment of supplying air from one introduction portion S1a to four peripheral siphon-type air diffusion pipes S1 can decrease the number of air introduction parts by decreasing the number of the introduction portions S1a as compared with the siphon-type air diffusion device S10A, it is advantageous in that air can be uniformly supplied to the siphon-type air diffusion pipes S1.

Figure 18:
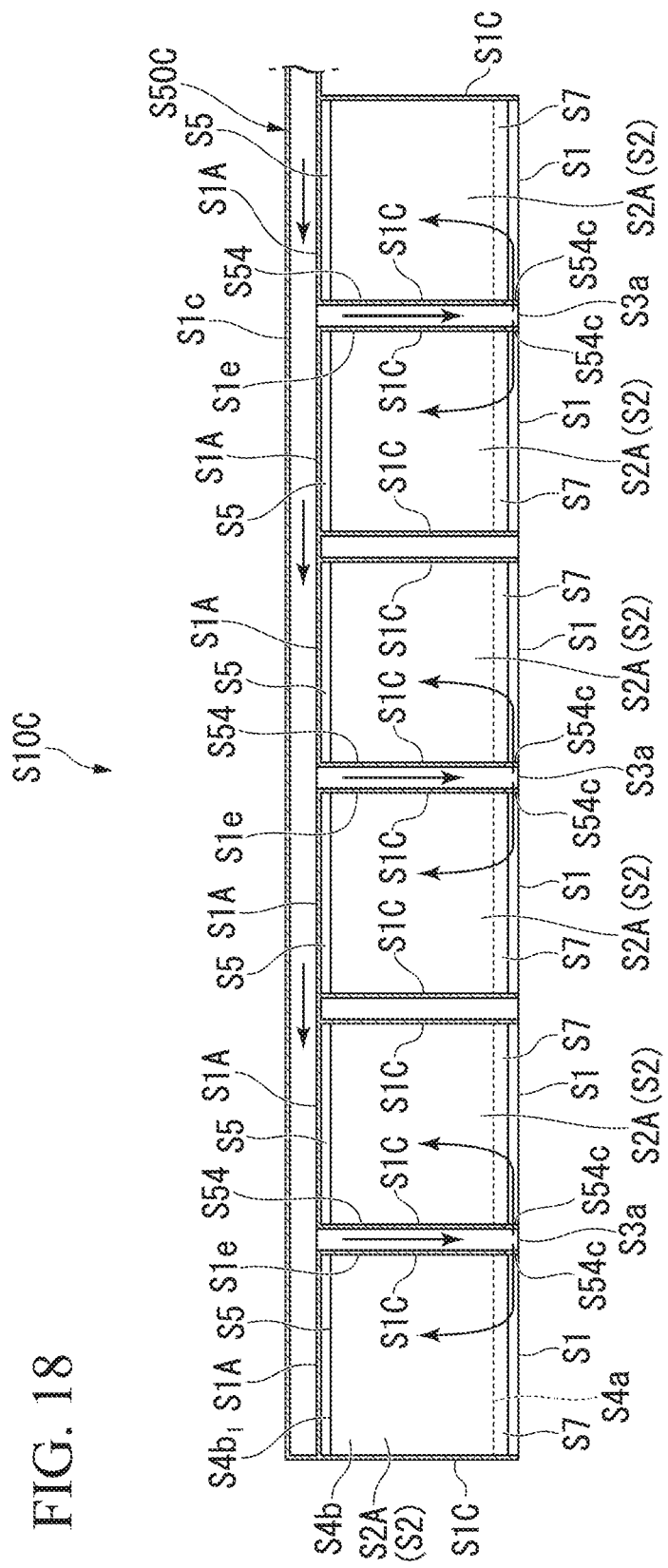
FIG. 18 is a cross-sectional view illustrating another example of the siphon-type air diffusion device of the second embodiment of the invention.

Further, the siphon-type air diffusion device of the invention may be obtained by integrating the distribution pipe and the siphon-type air diffusion pipe. Specifically, for example, a siphon-type air diffusion device S10C illustrated in FIG. 18 may be used. The same parts as those in FIG. 11 in FIG. 18 are indicated by the same reference numerals and a description thereof is omitted.

The siphon-type air diffusion device S10C includes six siphon-type air diffusion pipes S1 which are arranged in series in the horizontal direction and an air supply member S50C that supplies air to the siphon-type air diffusion pipes S1. The air supply member S50C includes the distribution pipe S1c and three introduction portions Se which are branched from the distribution pipe S1c. In the siphon-type air diffusion device S10C, when six siphon-type air diffusion pipes S1 are formed into three sets so that each set includes two siphon-type air diffusion pipes S1 from the upstream side, each introduction portion S1e is branched from a portion corresponding to a gap between the adjacent siphon-type air diffusion pipes S1 of each set in the distribution pipe S1c and extends in the vertical direction between the adjacent siphon-type air diffusion pipes S1.

The introduction portion S1e is the same as the introduction portions S1a of the air supply members S50 and S50A except that the tubular branch pipe portion S52 branched from the distribution pipe S1c is not provided. An embodiment of the siphon-type air diffusion device S10C is the same as the embodiment of the siphon-type air diffusion device S10A except that the distribution pipe S1c is integrated with each siphon-type air diffusion pipe S1 without using the introduction portion S1e the branch pipe portion S52.

Also in the siphon-type air diffusion device S10C, similarly to the siphon-type air diffusion device S10, even when the flow rate of air is small, the air does not flow reversely inside the siphon-type air diffusion pipe S1 having a slow air diffusion timing and the bubbles discharged from the siphon-type air diffusion pipe S1 are prevented from becoming unexpectedly small. As a result, it is possible to uniformly diffuse air from the plurality of siphon-type air diffusion pipes S1. Further, it is possible to prevent the blockage of the air supply port S3a when the sludge adhering to the air supply port S3a of the introduction portion S1e is dried and solidified.

Further, an embodiment of integrating the distribution pipe S1c with the siphon-type air diffusion pipe S1 is advantageous in that the strength is high. Further, since the assembly operation of the siphon-type air diffusion device S10C is easy and the number of components can be decreased, there is an advantage in cost.

In the siphon-type air diffusion device of the invention, the introduction portion or the distribution pipe of the air supply member may not be integrated with the siphon-type air diffusion pipe. For example, the siphon-type air diffusion device may be formed such that a tubular introduction pipe extending to a position below the lower end of the siphon-type air diffusion pipe is provided as the introduction portion and air is supplied from the air supply port formed as the opening end of the lower end of the introduction pipe to the siphon chamber inside the siphon-type air diffusion pipe through the treatment water introduction portion.

Further, the siphon-type air diffusion device may be formed such that the notch portion is not formed at the end portion of the introduction portion and the air supply port does not include the notch portion.

[Water Treatment Method]

Hereinafter, a water treatment method using the water treatment device S1000 will be described as an example of the water treatment methods according to the first and second embodiments of the invention. The water treatment method of the invention can be performed by using the water treatment device 1000 instead of the water treatment device S1000. The water treatment method of the invention includes an activated sludge treatment step of performing an activated sludge treatment on raw water using activated sludge and a membrane separation step of performing a membrane separation treatment on sludge-containing treatment water obtained by the activated sludge treatment step.

(Activated Sludge Treatment Step)

In the water treatment method using the water treatment device S1000, wastewater (raw water) such as industrial wastewater or domestic wastewater discharged from factories or households is caused to flow into the activated sludge treatment tank S11 through the first passage S12 and is subjected to the activated sludge treatment in the activated sludge treatment tank S11 to become biological treatment water. The treated sludge-containing treatment water (the target treatment water) is caused to flow into the membrane separation tank S21 through the second passage S13.

(Membrane Separation Step)

In the membrane separation tank S21, the membrane separation treatment is performed on the sludge-containing treatment water (the target treatment water) containing the activated sludge and the biological treatment water by the membrane module S22 of the MBR device S100. During the membrane separation treatment, aeration is performed by the siphon-type air diffusion device S10.

In the siphon-type air diffusion device S10, it is preferable to prevent the blockage due to the sludge by periodically injecting water into the introduction portion S1a.

A part of the sludge-containing treatment water SB is carried by the sludge carrying unit S30 from the membrane separation tank S21 to the activated sludge treatment tank S11. The treatment water obtained by performing the membrane separation treatment on the sludge-containing treatment water SB by the membrane module S22 is sent to the treatment water tank S41 through the third passage S33 to be stored therein. The treatment water stored in the treatment water tank S41 can be reused as industrial water or can be discharged to rivers or the like.

Further, the water treatment method of the invention may be a method of simultaneously performing the activated sludge treatment step and the membrane separation step using the water treatment device in which the MBR device 100 (S100) is provided inside the activated sludge treatment tank 11 (S11).

Although the preferred embodiments according to the invention has been described with reference to the attached drawings, it goes without saying that the invention is not limited to this example. The shapes and combinations of the components illustrated in the above-described examples are merely examples and various modifications can be made based on design requirements or the like without departing from the gist of the invention.

EXAMPLES

Hereinafter, the invention will be described with reference to examples, but the invention is not limited to these examples.

Examples 1 to 4

Figure 7:
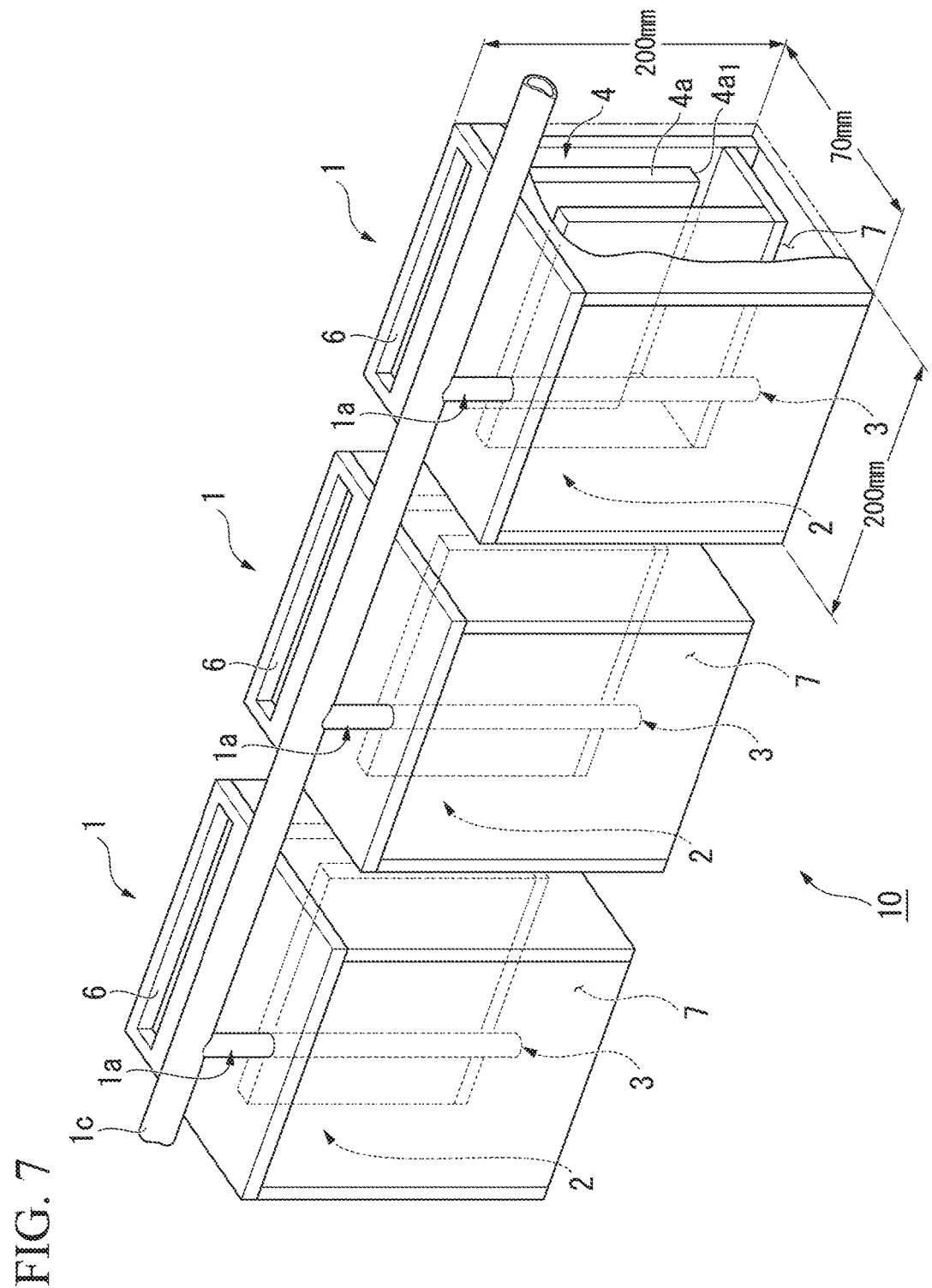
FIG. 7 is a schematic perspective view illustrating a configuration of the siphon-type air diffusion device 10 used in examples.

A siphon-type air diffusion device having the same configuration as that of the siphon-type air diffusion device 10 illustrated in FIG. 7 was prepared. The siphon-type air diffusion device 10 includes three siphon-type air diffusion pipes 1. In the siphon-type air diffusion device 10, three siphon-type air diffusion pipes 1 are casings which have the same shape and have 200 mm×200 mm×70 mm in external dimensions. Further, the volume of the siphon chamber 2 of the siphon-type air diffusion pipe 1 was 1170 ml. Further, the plan view shape of the air diffusion hole 6 of the siphon-type air diffusion pipe 1 was a rectangular shape. The area of the plan view shape of the air diffusion hole 6 was 19 cm$^2$ and the length of the plan view shape in the longitudinal direction was 19 cm. In each of the siphon-type air diffusion pipes 1 illustrated in FIG. 7, the ratio R calculated based on the following equation was 0.62.

$R$=(Volume (unit: m$^3$) of siphon chamber)/(Area (unit: m$^2$) of plan view shape of air diffusion hole)

The siphon-type air diffusion device 10 was inserted into the water tank and was immersed along the bottom surface having a gradient illustrated in Table 1. Then, air of 60 L/min was continuously supplied through the gas supply port 3 provided below the lower end 4$a$) of the first partition wall 4$a$. Then, it was examined whether bubbles were generated from three siphon-type air diffusion pipes 1. Furthermore, a state in which bubbles were generated from the siphon-type air diffusion pipe 1 was visually checked.

Comparative Example 1

A test was performed similarly to Example 1 except that the position of the gas supply port 3 of each siphon-type air diffusion pipe 1 illustrated in FIG. 7 was provided above the lower end 4$a_1$ of the first partition wall 4$a$ and an examination on whether bubbles were generated was performed.

In this evaluation, a state in which bubbles are stably generated from three siphon-type air diffusion pipes 1 is indicated by "AA", a state in which bubbles are stably generated from three siphon-type air diffusion pipes 1 although the state is not stable is indicated by "A", and a state in which bubbles are not generated in some regions in three siphon-type air diffusion pipes 1 is indicated by "B". The result is illustrated in Table 1.

In Table 1, in Examples 1 to 4 and Comparative Example 1, a state in which the position of the gas supply port 3 of each siphon-type air diffusion pipe 1 is located below the lower end 4$a_1$ of the first partition wall 4$a$ is indicated by the "lower side" and a state in which the position of the gas supply port 3 is located above the lower end 4$a_1$ of the first partition wall 4$a$ is indicated by the "upper side".

TABLE 1

| | Position | Cross-sectional area | Gradient of bottom surface of water tank | | |
|---|---|---|---|---|---|
| | of gas supply port | of introduction pipe (unit: mm$^2$) | None | 5/1000 | 15/1000 |
| Example 1 | Lower side | 314 | A | B | B |
| Example 2 | Lower side | 133 | AA | A | B |
| Example 3 | Lower side | 50 | AA | A | A |
| Example 4 | Lower side | 28 | AA | AA | A |
| Comparative Example 1 | Upper side | 314 | B | B | B |

In Examples 1 to 4 and Comparative Example 1, a state in which the height of the liquid level of the siphon chamber 2 changed with the operation of the siphon-type air diffusion device 10 illustrated in FIG. 7 was checked. In the siphon-type air diffusion device 10 of Examples 1 to 4, a state in which bubbles were stably generated from all siphon-type air diffusion pipes 1 in at least one condition of the gradient of the bottom surface of the water tank illustrated in Table 1 was checked. Further, in Example 3 and Example 4, a state in which bubbles were stably generated from all siphon-type air diffusion pipes 1 in a condition of the gradient of the bottom surface of the water tank illustrated in Table 1 was checked.

Meanwhile, in the siphon-type air diffusion device 10 of Comparative Example 1, a state in which no bubble was generated from at least one siphon-type air diffusion pipe 1 in a condition of the gradient of the bottom surface of the water tank illustrated in Table 1 was checked.

Examples S1 to S4

A siphon-type air diffusion device having the same configuration as that of the siphon-type air diffusion device S10A illustrated in FIG. 16 was prepared. In the siphon-type air diffusion device, six siphon-type air diffusion pipes were casings having the same shape and having a height of 200 mm×a length of 162 mm×a width of 70 mm in external dimensions. The volume of the siphon chamber of the siphon-type air diffusion pipe was set to 973 ml and the area of the plan view shape of the air diffusion hole was set to 15 cm$^2$. Air was supplied from the distribution pipe having an inner diameter of 20 mm (a cross-sectional area of 314 mm$^2$) to the introduction portion of the minimum passage cross-sectional area of 50 mm$^2$ (a cross-sectional area of 1800 mm$^2$ of the minimum passage cross-sectional area portion) and was supplied to the siphon chamber through the notch portion (a width of 20 mm) having the same shape as that of FIG. 13. Furthermore, the minimum passage cross-sectional area portion was provided at the same position as that of the upper plate portion of the siphon-type air diffusion pipe in the introduction portion.

The siphon-type air diffusion device was inserted into the water tank and was immersed along the bottom surface having a gradient illustrated in Table 1. Then, air of 60 L/min was continuously supplied. Then, a state in which bubbles were generated from six siphon-type air diffusion pipes was visually checked.

Comparative Example S1

Figure 19:
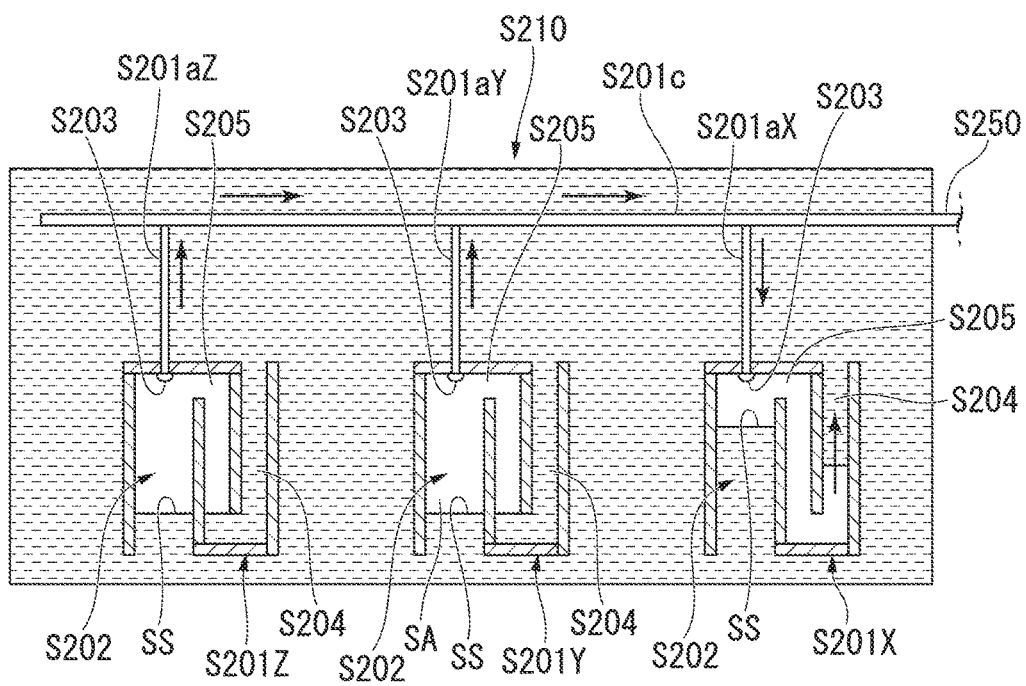
FIG. 19 is a cross-sectional view illustrating an operation mechanism of a conventional siphon-type air diffusion device.

Air was continuously supplied similarly to Example 1 except that air was directly supplied from the distribution pipe to a position above six siphon-type air diffusion pipes by using the siphon-type air diffusion device having the same configuration as that of the siphon-type air diffusion device S210 illustrated in FIG. 19 except that the number of the siphon-type air diffusion pipes was six and a state in which bubbles were generated from six siphon-type air diffusion pipes was visually checked.

In this evaluation of the bubble generation state of the siphon-type air diffusion device of each example, a state in which bubbles are stably generated from six siphon-type air diffusion pipes is indicated by "AA", a state in which bubbles are generated from six siphon-type air diffusion pipes although the state is not stable is indicated by "A", and a state in which bubbles are not generated in some regions in six siphon-type air diffusion pipes is indicated by "B". The result is illustrated in Table 2.

In Table 2, in Examples S1 to S4 and Comparative Example S1, a state in which the position of the gas supply port S3 of each siphon-type air diffusion pipe 1 is located below the lower end S4$a_1$ of the first partition wall S4$a$ is indicated by the "lower side" and a state in which the position of the gas supply port S3 is located above the lower end S4$a_1$ of the first partition wall S4$a$ is indicated by the "upper side".

TABLE 2

| | Position of gas supply port | Cross-sectional area of introduction pipe (unit: mm$^2$) | Gradient of bottom surface of water tank | |
|---|---|---|---|---|
| | | | None | 15/1000 |
| Example S1 | Lower side | 314 | AA | B |
| Example S2 | Lower side | 133 | AA | B |
| Example S3 | Lower side | 50 | AA | A |
| Example S4 | Lower side | 28 | AA | AA |
| Comparative Example S1 | Upper side | 314 | B | B |

In Comparative Example S1, even when the bottom surface of the water tank did not have a gradient, a timing at which the liquid level of the siphon chamber reached the lower end of the first partition wall due to the influence of the fluctuation of the liquid level was not uniform and no air was discharged from any one of the siphon-type air diffusion pipes.

In Examples S1 and S2, even when the bottom surface of the water tank did not have a gradient, bubbles were discharged from all siphon-type air diffusion pipes without the influence of the air discharging operation from the other siphon-type air diffusion pipes.

In Example S3, the flow rate of the air distributed to each siphon-type air diffusion pipe became non-uniform due to the gradient of the bottom surface of the water tank and bubbles were discharged from all siphon-type air diffusion pipes without the influence of the air discharging operation from the other siphon-type air diffusion pipes.

In Example S4, even in the gradient of the bottom surface of the water tank of 15/1000, bubbles were discharged from all siphon-type air diffusion pipes without the influence of the air discharging operation from the other siphon-type air diffusion pipes.

EXPLANATIONS OF LETTERS OR NUMERALS

1 SIPHON-TYPE AIR DIFFUSION PIPE
1$a$ INTRODUCTION PIPE
1$c$ DISTRIBUTION PIPE
2 SIPHON CHAMBER
2A FIRST SIPHON CHAMBER
2B SECOND SIPHON CHAMBER
3 GAS SUPPLY PORT
4 PATH
5 COMMUNICATION PORTION
6 AIR DIFFUSION HOLE
10 SIPHON-TYPE AIR DIFFUSION DEVICE
1$a_1$ LOWER END OF INTRODUCTION PIPE
4$a_1$ LOWER END OF FIRST PARTITION WALL (PARTITION WALL)
14 AIR DIFFUSION DEVICE
14$a$ AIR DIFFUSION PIPE
22 MEMBRANE MODULE
100 MEMBRANE BIOREACTOR
A, A1 AIR
S1 SIPHON-TYPE AIR DIFFUSION PIPE
S1$a$, S1$d$, S1$e$ INTRODUCTION PORTION
S1$b$ BLOWER
S1$c$ DISTRIBUTION PIPE
S2 SIPHON CHAMBER
S2A FIRST SIPHON CHAMBER
S2B SECOND SIPHON CHAMBER
S3$a$, S3$b$ AIR SUPPLY PORT
S5 COMMUNICATION PORT
S6 AIR DIFFUSION HOLE
S7 TREATMENT WATER INLET
S10, S10A to S10C SIPHON-TYPE AIR DIFFUSION DEVICE
S11 ACTIVATED SLUDGE TREATMENT TANK
S21 MEMBRANE SEPARATION TANK
S21$a$ BOTTOM SURFACE PORTION
S22 MEMBRANE MODULE
S41 TREATMENT WATER TANK
S50, S50A to S50C AIR SUPPLY MEMBER
S100 MEMBRANE BIOREACTOR
S1000 WATER TREATMENT DEVICE

The invention claimed is:

1. A siphon-type air diffusion device for intermittently performing aeration, comprising:
at least two siphon-type air diffusion pipes; and
an air supply member that supplies air to the siphon-type air diffusion pipes,
wherein each of the siphon-type air diffusion pipes includes
a siphon chamber which includes a first portion and a second portion, wherein the second portion is on the downstream side of the first portion,
a communication portion which connects the first portion of the siphon chamber to the second portion of the siphon chamber,
an air diffusion hole which is provided on the downstream side of the siphon chamber, a path which extends from the siphon chamber to the air diffusion hole, and a treatment water inlet which is provided on the upstream side of the siphon chamber, wherein the air supply member includes a distribution pipe which extends in a direction in which the siphon-type air diffusion pipes are arranged, and one or more introduction portions branched from the distribution pipe, wherein each of the introduction portions includes at least one air supply port supplying air to one of the siphon-type air diffusion pipes, wherein the distribution pipe is provided above the air supply port, and wherein in the air supply port of each of the introduction portions, the air supply port located at the uppermost position in the vertical direction is provided below a lower end of a partition wall dividing the siphon chamber and the path.

2. The siphon-type air diffusion device according to claim 1, wherein the air supply port located at the uppermost position in the vertical direction is provided above a lower end of the path.

3. The siphon-type air diffusion device according to claim 1, wherein the one or more introduction portions are provided so as to be located between two adjacent siphon-type air diffusion pipes, and wherein the air supply port includes a notch portion formed at a portion facing the treatment water inlet of an end portion opposite to the distribution pipe in the introduction portion.

4. The siphon-type air diffusion device according to claim 1, wherein air is supplied from the one or more introduction portions to each of the siphon chambers of at least two siphon-type air diffusion pipes adjacent to the one or more introduction portions.

5. The siphon-type air diffusion device according to claim 1, wherein each of the introduction portions is a guide pipe having the air supply port provided at a lower end of the guide pipe.

6. The siphon-type air diffusion device according to claim 1, wherein the minimum cross-sectional area of a passage of each of the introduction portions is in a range of 20 to 350 mm$^2$.

7. The siphon-type air diffusion device according to claim 1, wherein a plan view shape of the air diffusion hole is an elongated shape extending in the direction in which the siphon-type air diffusion pipes are arranged, and wherein an area of a plan view shape of the air diffusion hole is 25 cm$^2$ or less and a length of the plan view shape in the longitudinal direction is 25 cm or less.

8. The siphon-type air diffusion device according to claim 1, wherein a ratio R (unit: m) calculated based on the following equation using the area of the plan view shape of the air diffusion hole satisfies a condition of 0.6 or more:

$R$=(Volume (unit: m$^3$) of the siphon chamber)/(Area (unit: m$^2$) of plan view shape of the air diffusion hole).

9. The siphon-type air diffusion device according to claim 1, wherein the introduction portions and the siphon-type air diffusion pipes are integrated with each other.

10. The siphon-type air diffusion device according to claim 1, wherein the distribution pipe and the siphon-type air diffusion pipes are integrated with each other.

11. A membrane bioreactor comprising:

the siphon-type air diffusion device according to claim 1; and a membrane module which performs a membrane separation treatment on sludge-containing treatment water containing activated sludge.

12. A water treatment method comprising:

performing an activated sludge treatment on raw water using activated sludge; and performing a membrane separation treatment on sludge-containing treatment water obtained by the activated sludge treatment, wherein the membrane bioreactor according to claim 11 is used in the membrane separation.

* * * * *